United States Patent
Ayotte et al.

(10) Patent No.: US 8,536,993 B2
(45) Date of Patent: Sep. 17, 2013

(54) MODULAR SYSTEM AND METHOD FOR PROVIDING BICYCLES

(75) Inventors: Alain Ayotte, Laval (CA); Michel Dallaire, Montreal (CA); Charles Ibrahim Khairallah, Montreal (CA)

(73) Assignee: Societe de Velo en Libre-Service, Lachine, Quebec (CA)

( * ) Notice: Subject to any disclaimer, the term of this patent is extended or adjusted under 35 U.S.C. 154(b) by 862 days.

(21) Appl. No.: 12/392,727

(22) Filed: Feb. 25, 2009

(65) Prior Publication Data

US 2009/0301976 A1  Dec. 10, 2009

Related U.S. Application Data

(60) Provisional application No. 61/059,464, filed on Jun. 6, 2008.

(51) Int. Cl.
 *B62J 3/00* (2006.01)

(52) U.S. Cl.
 USPC .............................. 340/432; 439/110; 211/5

(58) Field of Classification Search
 USPC ...... 211/5, 13.1, 17–22; 701/2; 70/233–236, 70/262–265; 340/432; 194/211; 439/100, 439/110 X, 116–119
 See application file for complete search history.

(56) References Cited

U.S. PATENT DOCUMENTS

| 2,320,332 | A | * | 5/1943 | Morten | 174/74 R |
| 3,649,951 | A | * | 3/1972 | Routh et al. | 439/117 |
| 5,158,472 | A | * | 10/1992 | Juhlin | 439/215 |
| 5,658,158 | A | * | 8/1997 | Milan | 439/214 |
| 5,841,351 | A | | 11/1998 | Rey | |
| 5,917,407 | A | | 6/1999 | Squire et al. | |
| 6,029,833 | A | * | 2/2000 | Yeh | 211/189 |
| 6,384,717 | B1 | * | 5/2002 | DeVolpi | 340/432 |
| 7,434,674 | B1 | | 10/2008 | Bain | |
| 7,748,511 | B1 | * | 7/2010 | Maher | 194/205 |
| 7,891,993 | B2 | * | 2/2011 | Huber et al. | 439/110 |
| 2002/0174077 | A1 | | 11/2002 | Yui et al. | |
| 2006/0116132 | A1 | | 6/2006 | Le Gars | |
| 2007/0158949 | A1 | | 7/2007 | Le Gars et al. | |

(Continued)

FOREIGN PATENT DOCUMENTS

| EP | 1382519 | 1/2004 |
| ES | 2308887 | 12/2008 |

(Continued)

*Primary Examiner* — Korie H Chan
(74) *Attorney, Agent, or Firm* — Pearl Cohen Zedek Latzer, LLP

(57) ABSTRACT

A modular system for providing bicycles at a given location according to a desired configuration, the system comprising at least one bicycle rack for storing a bicycle, each bicycle rack comprising an electronic lock for removably securing a corresponding bicycle thereto, each bicycle rack further comprising a corresponding attaching means having an electrical connector operatively coupled to the electronic lock, an energy providing means for providing energy to each electronic lock, the energy providing means comprising a corresponding attaching means having a connector operatively coupled thereto and a structure to be installed at the given location, the structure comprising an elongated base, a plurality of spaced-apart receiving means located on the base, each of the spaced-apart receiving means being adapted for receiving a selected attaching means from the at least one bicycle rack and the energy providing means according to the desired configuration and an electric network interconnecting each of the spaced-apart receiving means to thereby provide a modular system for providing bicycles.

36 Claims, 20 Drawing Sheets

(56) References Cited

U.S. PATENT DOCUMENTS

| | | |
|---|---|---|
| 2007/0220933 A1 | 9/2007 | Gagosz et al. |
| 2007/0239465 A1 | 10/2007 | Le Gars |
| 2008/0018440 A1 | 1/2008 | Aulbers et al. |
| 2008/0027794 A1 | 1/2008 | Le Gars et al. |
| 2008/0034820 A1 | 2/2008 | Gagosz et al. |
| 2009/0240575 A1* | 9/2009 | Bettez et al. .................... 705/13 |
| 2010/0228405 A1* | 9/2010 | Morgal et al. .................... 701/2 |

FOREIGN PATENT DOCUMENTS

| | | |
|---|---|---|
| FR | 2804779 | 8/2001 |
| JP | 2005196403 | 7/2005 |
| JP | 2005202900 | 7/2005 |
| WO | 02067210 | 8/2002 |
| WO | 2006095092 | 9/2006 |
| WO | 2008157443 | 12/2008 |

* cited by examiner

MODULAR SYSTEM AND METHOD FOR PROVIDING BICYCLES

RELATED APPLICATION

The present application claims priority of U.S. provisional patent application No. 61/059,464 filed on Jun. 6, 2008, the specification of which is incorporated herein by reference.

FIELD OF THE INVENTION

The invention relates to systems and methods for providing bicycles. More precisely, this invention pertains to a modular system for providing bicycles and associated methods.

BACKGROUND OF THE INVENTION

Bicycles are very useful for humans and good for the environment. Moreover, they help humans stay fit.

Having a bicycle in a large city however may not be as convenient as it seems for various reasons. For instance, it might be complicated to store temporarily the bicycle, such as for instance when a user reaches an intended destination, or permanently, such as for instance when the user brings back his bicycle home. This may discourage potential users from having and using a bicycle.

Some manufacturers have provided systems for renting bicycles that may be installed at various locations in a given city. For instance, Squire et al. have disclosed in U.S. Pat. No. 5,917,407 a system for renting bicycles.

Unfortunately, while the use of such system may be very attractive for an end-user, the operator managing such system may be faced with various serious challenges.

For instance, an end user may rent a bicycle at a first location and desire to drop the bicycle at another location. Some locations may therefore become overfilled with bicycles while some other locations may become depleted in bicycles. The system may therefore become de-balanced and the operator may be faced with the issue of having to transfer bicycles from one location to another to rebalance the system which is a drawback since it adds operation costs and therefore reduces profits.

Moreover, such systems for renting bicycles may become cumbersome to operate and manage in cities where weather conditions are harsh such as for instance in Montreal.

Moreover, in case of a failure of some of the components, such system may require a technician on site to check and repair the defective component which may also be problematic since it may interrupt the normal operation of the whole system.

It will also be appreciated that the system may be complicated to use in the case of special, temporary outdoor events.

There is therefore a need for a method and apparatus that will overcome at least one of the above-identified drawbacks.

BRIEF SUMMARY

There is provided a modular system for providing bicycles at a given location according to a desired configuration, the modular system comprising at least one bicycle rack for storing a bicycle, each of the at least one bicycle rack comprising an electronic lock secured thereto for removably securing a corresponding bicycle, each of the at least one bicycle rack further comprising a corresponding attaching means having an electrical connector operatively coupled to the electronic lock, an energy providing means for providing energy to each electronic lock of the at least one bicycle rack, the energy providing means comprising a corresponding attaching means having an electrical connector operatively coupled thereto and a structure to be installed at the given location, the structure comprising an elongated base, a plurality of spaced-apart receiving means located on the base, each of the plurality of spaced-apart receiving means being adapted for receiving a selected attaching means from the at least one bicycle rack and the energy providing means according to the desired configuration and an electric network interconnecting each of the plurality of spaced-apart receiving means to thereby providing a modular system for providing bicycles.

Thanks to its modularity, the system may be tailored according to specific needs, which is of great advantage.

Moreover, the modularity of the system may help to reduce down time of the whole system since a defective modular component may be easily replaced and repaired at a later time and/or at another location without disrupting the operating of the whole system, which is of great advantage.

In one embodiment, the elongated base comprises a sheet of rigid material having a first outer planar surface, a second outer planar surface and a third central planar surface extending therebetween, each of the receiving means extending on the central planar surface in an aligned configuration.

In another embodiment, the elongated base comprises at least one end suitable for connecting a neighboring elongated base thereto.

In another embodiment, the elongated base comprises a first end and a second end, each being suitable for connecting a corresponding neighboring elongated base thereto, the first end comprising a first connecting device and the second end comprising a second connecting device, the first connecting device being adapted for connecting with the corresponding second connecting device of the neighboring elongated base.

In a further embodiment, a corresponding one of the first and second connecting devices of the elongated base comprises a securing device cooperating with the corresponding connecting device of the corresponding end of the neighboring elongated base for securing the elongated base and the neighboring elongated base together.

In still a further embodiment, the first connecting device comprises at least one male connector projecting horizontally and comprising a hole extending upwardly, and the second connecting device comprises at least one corresponding female connector projecting horizontally and comprising a corresponding hole extending upwardly, each hole of two corresponding connecting devices extending in an aligned configuration when connected together for providing a screw passage. The securing element comprises a corresponding bore extending through the elongated base and a screw adapted for insertion in the screw passage through the bore of the elongated base.

In another further embodiment, the first connecting device comprises an additional male connector and the second connecting device comprises an additional female connector, the securing element further comprising an additional corresponding bore extending through the elongated base and an additional screw.

In one embodiment, each of the first connecting device and the second connecting device comprises a corresponding complementary cooperating connecting member.

In another embodiment, the structure comprises a wire housing mounted under the elongated base and extending therealong for receiving at least a portion of the electric network.

In one embodiment, each of the receiving means of the structure comprises an attaching device adapted for cooperating with a corresponding one of the attaching means of the at least one bicycle rack and the energy providing means.

In a further embodiment, the attaching device of each of the receiving means comprises a plurality of holes, each of the attaching means of the at least one bicycle rack and the energy providing means comprising a plurality of corresponding holes and a plurality of corresponding screws for screwing the attaching means to a corresponding attaching device of the receiving means.

In one embodiment, the energy providing means comprise a solar energy providing means. This is of great advantage since the system may operate in a stand alone configuration without requiring external energy.

In a further embodiment, the energy providing means comprise a base provided with the attaching means, an elongated member mounted on the base and a solar panel assembly mounted on the elongated member.

In still a further embodiment, the energy providing means further comprise a plurality of batteries mounted with the base and operatively connected to the solar panel assembly.

In one embodiment, the modular system further comprises a bicycle providing means interconnected to the electric network for managing a providing of a corresponding bicycle to a user.

In a further embodiment, the bicycle providing means comprises a user interface for establishing communication between the system and a user, the bicycle providing means further comprising a control unit for controlling the electronic lock of the at least one bicycle rack according to a user request.

In another embodiment, the bicycle providing means is integrated with the energy providing means.

In one embodiment, the modular system further comprises a servicing module having a corresponding attaching means for attaching the servicing module in a corresponding one of the receiving means, the servicing module being selected from a group comprising an advertising module, a vending machine, a ticket distribution booth and a payment module for renting at least a corresponding one of the bicycles.

In another embodiment, the servicing module comprises a payment module comprising means for communicating with a distant server.

In one embodiment, the electric network comprises a plurality of network connectors, each being provided proximate to a corresponding receiving means of the elongated base for connecting with a corresponding connector of the at least one bicycle rack and the energy providing means. The electric network further comprises at least one additional end connector mounted at an end thereof for coupling a neighboring electric network.

In one embodiment, the electric network interconnecting each of the plurality of spaced-apart receiving means comprises a configuration selected from a group consisting of a parallel configuration and a serial configuration.

In one embodiment, the structure further comprises a set of leveling screws mounted under the elongated base for enabling a leveling of the structure.

In another embodiment, the structure further comprises at least one ending element securable to a respective end of the elongated base, the ending element being selected from a group consisting of an end covering for covering the corresponding connecting device and an upright panel.

According to another aspect, there is also provided a method for installing a modular system for providing bicycles at a given location according to a desired configuration, the method comprising providing an elongated base comprising a plurality of spaced-apart receiving means; laying down the elongated base at the given location; providing at least one bicycle rack for storing a bicycle, each of the at least one bicycle rack comprising an electronic lock secured thereto for removably securing a corresponding bicycle; providing an energy providing means for providing energy; attaching each of the at least one bicycle rack and the energy providing means in a corresponding one of the spaced-apart receiving means of the elongated base; and electrically interconnecting each of the at least one bicycle rack and the energy providing means together.

In one embodiment, the method further comprises providing at least one additional elongated base comprising a plurality of spaced-apart receiving means; laying down the at least one additional elongated base at the given location proximate the elongated base; and operatively connecting the at least one additional elongated base at an end of the elongated base.

In one embodiment, the given location is selected from a group comprising a sidewalk, a portion of a street, a parking lot, a park, a beach and a substantially horizontal surface.

In a further embodiment, the desired configuration comprises an initial predetermined configuration defined according to an intended use, the method further comprising monitoring use of the bicycles for providing current usage information based on the initial predetermined configuration; defining an optimal configuration for the modular system based on the current usage information, the optimal configuration comprising an optimal number of the bicycles and the associated bicycle racks and a corresponding number of elongated bases; and configuring the modular system according to the optimal configuration, the configuring comprising providing the corresponding number of elongated bases; laying down the corresponding number of elongated bases at the given location; operatively connecting each of the corresponding number of elongated bases together; providing the optimal number of the bicycles and the associated bicycle racks; attaching each of the optimal number of bicycle racks in a corresponding one of the spaced-apart receiving means of a corresponding one of the elongated bases; and electrically interconnecting each of the optimal number of bicycle racks and the energy providing means together.

In still a further embodiment, the current usage information comprises a bicycle occupation rate associated with each of the bicycles.

According to another aspect, there is also provided a method for providing bicycles at a given location according to a desired configuration, the method comprising providing a modular system as previously described; installing the modular system at the given location according to the desired configuration; establishing communication between the system and a user for defining a user request; providing a corresponding bicycle to the user according to the user request; and after use, collecting the corresponding bicycle from the user.

In one embodiment, the collecting is performed at another location provided with another modular system.

In another embodiment, the providing a corresponding bicycle is done for a fee.

According to another aspect, there is also provided a method of doing business in providing bicycles at a given location according to a desired configuration with the modular system as previously described, wherein the providing a corresponding bicycle is done for a fee.

In one embodiment, the providing a corresponding bicycle is done by a third party.

According to another aspect, there is also provided a method of doing business in providing bicycles at a given location according to a desired configuration, the method comprising providing by a provider a modular system as previously described to a third party; operating the modular system wherein the operating is done by a third party for a fee; and reconveying by the third party a portion of the fee to the provider.

In one embodiment, the fee is determined according to an occupation rate associated to each of the corresponding bicycles.

BRIEF DESCRIPTION OF THE DRAWINGS

These and other objects and advantages of the invention will become apparent upon reading the detailed description and upon referring to the drawings in which.

Further details of the invention and its advantages will be apparent from the detailed description included below.

DETAILED DESCRIPTION

In the following description of the embodiments, references to the accompanying drawings are by way of illustration of an example by which the invention may be practiced. It will be understood that other embodiments may be made without departing from the scope of the invention disclosed.

The invention discloses a modular system for providing bicycles and associated methods. As previously mentioned, providing a user with a bicycle for a temporary use may present several advantages, particularly in large cities. The system disclosed may be easily installed, which is a great advantage. Moreover, the system is modular and may then be advantageously installed in temporary locations for special events, and may also be configured in a dynamic fashion according to specific needs, as it will be more clearly detailed thereinafter.

The modular system disclosed, thanks to its modularity, may be easier to manage and repair, and may also help reducing down time of the whole system due to a defective component, as it will be more apparent upon reading of the description.

Moreover, as it will become more apparent upon the reading of the description, the modular system disclosed provides an efficient economical solution in the managing of a fleet of bicycles since it enables an optimization of the available resources, which is of great advantage.

Figure 1:
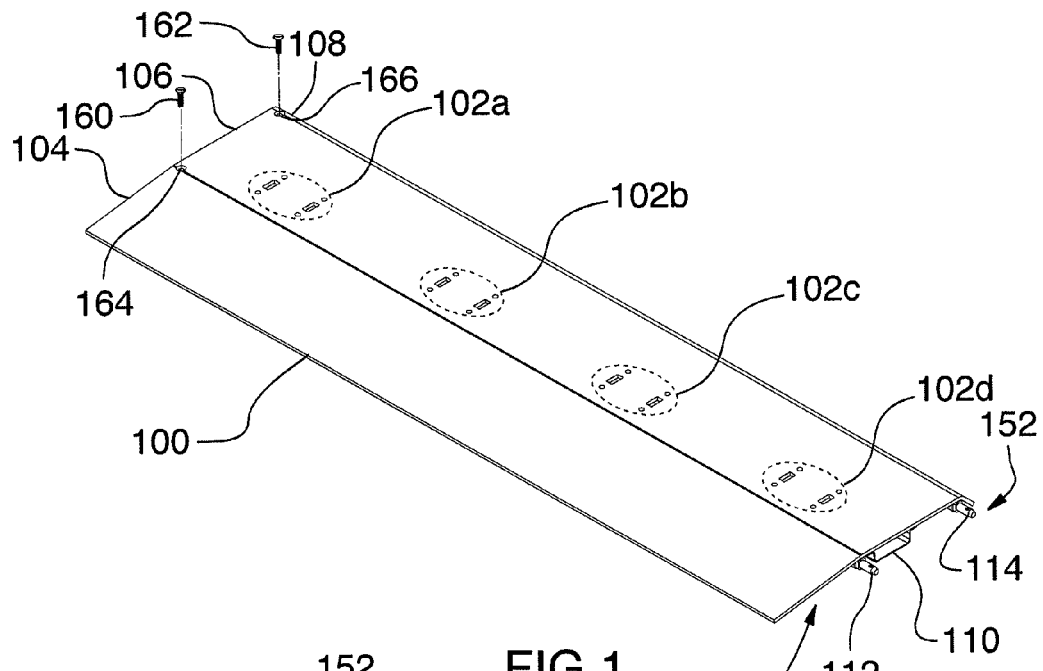
FIG. 1 is a front perspective view of an elongated base of a structure.

Now referring to FIG. 1, there is shown an embodiment of a structure to be installed at a given location. It will be appreciated that the given location may be selected from a group consisting of sidewalks, portions of a street, parking lots, parks, beaches or any other planar surface. Moreover it will be appreciated that in one embodiment the given location is characterized by a substantially horizontal surface.

Still referring to FIG. 1, the structure comprises an elongated base 100. In one embodiment, the elongated base 100 has a substantially rectangular shape. Alternatively, the elongated base 100 may have any other shape suitable for a given configuration.

The elongated base 100 comprises in this embodiment a first planar surface 104, a second planar surface 106 and a third planar surface 108. It will be appreciated that each of the first planar surface 104, the second planar surface 106 and the third planar surface 108 has a substantially rectangular shape. It will be appreciated that the second planar surface 106 is substantially horizontal. In this embodiment the elongated base 100 comprises a sheet of rigid material that has been slightly bent to define the planar surfaces 104, 106, 108 but the skilled addressee will appreciate that other arrangements may be considered.

A plurality of spaced-apart receiving means 102 is located on the elongated base 100. In one embodiment, the plurality of spaced-apart receiving means 102 is located on the second planar surface 106. In the embodiment disclosed in FIG. 1, the plurality of spaced-apart receiving means 102 comprises a first receiving means 102a, a second receiving means 102b, a third receiving means 102c and a fourth receiving means 102d. The skilled addressee will further appreciate that while in FIG. 1, the first receiving means 102a, the second receiving means 102b, the third receiving means 102c and the fourth receiving means 102d are aligned, various other configurations may be possible alternatively.

Still referring to FIG. 1, the elongated base 100 has a first connecting end 150 and a second connecting end 152. Each of the first connecting end 150 and the second connecting end 152 is used to connect the elongated base 100 to another neighboring elongated base (not shown) to thereby create a structure comprising more than one elongated base. The skilled addressee will appreciate that an elongated base provided with a single connecting end may be envisaged.

In the embodiment disclosed in FIG. 1, the first connecting end 150 comprises a first connecting device 152 comprising a first male connector 112 and a second male connector 114, each having a cylindrical elongated shape.

Figure 1A:
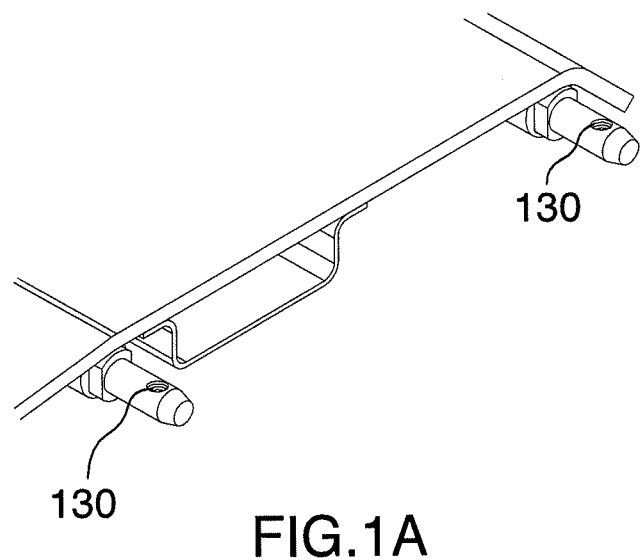
FIG. 1A is an enlarged view of a portion of the elongated base disclosed in FIG. 1.

In the illustrated embodiment, the first male connector 112 and the second male connector 114 extend horizontally and define a corresponding horizontal surface. Moreover, as better shown in FIG. 1A, each of the first male connector 112 and the second male connector 114 comprises a vertically oriented tap hole 130 used for securing the elongated base 100 to a neighboring elongated base. It will be appreciated that two corresponding holes 132 are provided in the vicinity of the opposed connecting end 152, as illustrated in FIG. 2A. The two corresponding holes 132 are used for receiving corresponding screws 160, 162 acting as a securing means and used for securing the elongated base 100 to a neighboring elongated base located at the second connecting end 152. In such case, the securing means comprises two corresponding bores 164, 166 extending through the elongated base 100. The screws 160, 162 will be inserted in the two corresponding holes 130 of the first and second male connectors 112, 114 through the bores 164, 166 and will go further inside the two vertically oriented tap holes located on the corresponding connecting device of the neighboring elongated base to thereby secure the elongated base 100 to the neighboring elongated base, as it will be more apparent later with reference to FIG. 2.

Still referring to FIG. 1, the structure comprises a wire housing 110. In one embodiment, the wire housing 110 is mounted under the second planar surface 106. More precisely, the wire housing 110 is mounted under each of the plurality of spaced-apart receiving means 102 and extends between the first connecting end 150 and the second connecting end 152. In one embodiment, the wire housing 110 may be made of treated steel or stainless steel.

It will be appreciated that the elongated base 100 may be made of a rigid material such as steel to give appropriate stability and weight and may be further covered with an anti-slip safety coating to provide protection from water as well as other outside conditions. The skilled addressee will appreciate that other material giving sufficient weight and stability may be considered.

Figure 2:
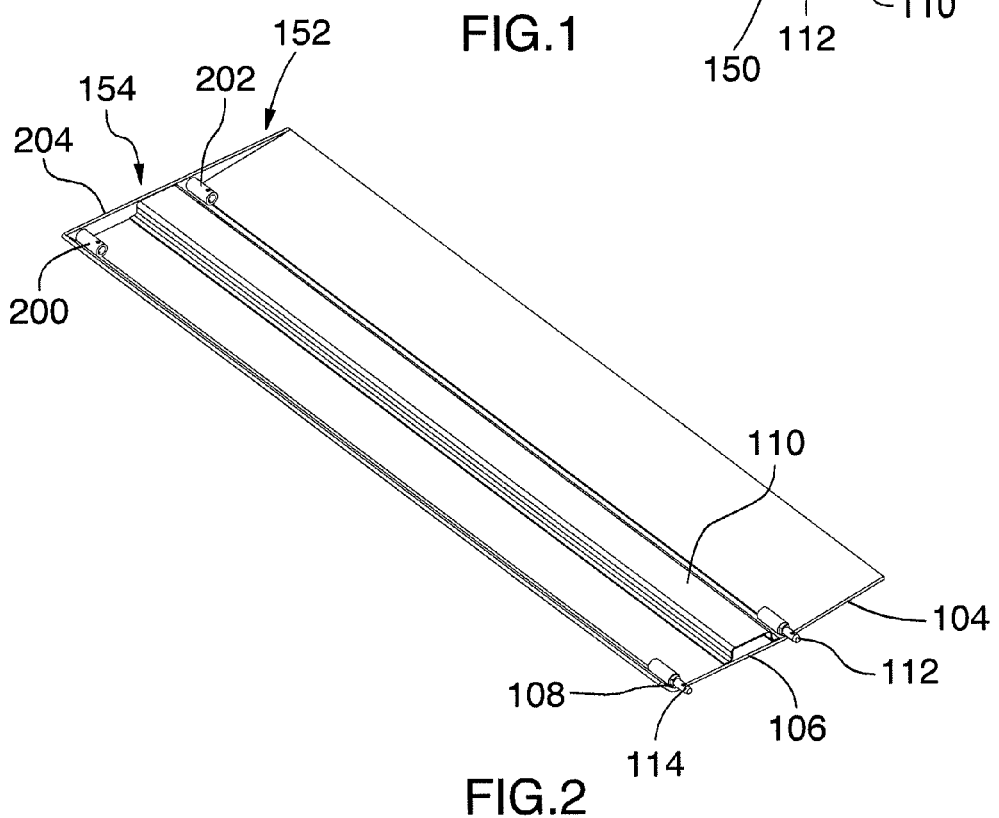
FIG. 2 is a bottom perspective view of the elongated base disclosed in FIG. 1.
Figure 2A:
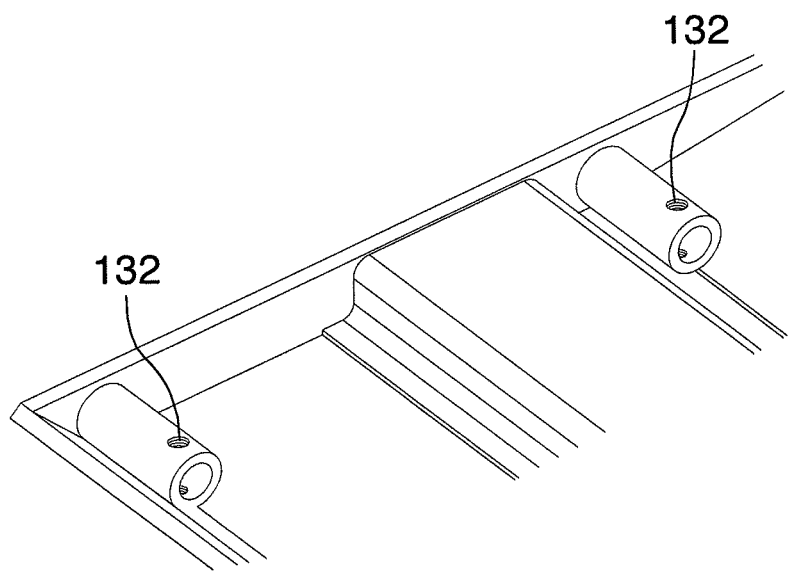
FIG. 2A is an enlarged view of a portion of the elongated base disclosed in FIG. 2.

Now referring to FIG. 2, there is shown a bottom view of the structure comprising the elongated base 100.

It will be appreciated that the second connecting end 152 comprises a second connecting device 154 comprising a first female connector 202 and a second female connector 200, each having a cylindrical shape.

In the illustrated embodiment, the first female connector 202 and the second female connector 200 extend horizontally and define a horizontal surface. Each of the first female connector 202 and the second female connector 200 is adapted to receive a corresponding male connector from a neighboring elongated base. Moreover, each of the first female connector 202 and the second female connector 200 is adapted to receive a corresponding screw 160, 162 used to secure a corresponding male connector thereto. In other words, and as better shown in FIG. 2A, each of the first and second female connectors 202, 200 comprises a hole 132 extending upwardly, each hole 132 extending in an aligned configuration with a corresponding hole 130 of a corresponding male connector when two corresponding elongated bases are connected together for providing a corresponding passage screw.

The connecting devices used to connect two neighboring elongated bases together have been described as female and cooperating male connectors but the skilled addressee will appreciate that various complementary cooperating members engageable together may be envisaged.

In one embodiment, the screws used to secure two neighboring elongated bases together comprise a securing element for preventing an unauthorized removal thereof. The skilled addressee will appreciate that various arrangements may be used.

In the embodiment disclosed in FIG. 2, a second connecting end cover 204 has been secured to the second connecting end 152 of the elongated base 100 and is covering the first female connector 202 and the second female connector 200. The skilled addressee will appreciate that the second connecting end cover 204 is used in instances where no elongated base is connected to the elongated base 100 using the female connectors 200, 202. The skilled addressee will also appreciate that a suitable first connecting end cover (not shown) may be used for covering the first and second male connectors 112, 114.

Figure 3:
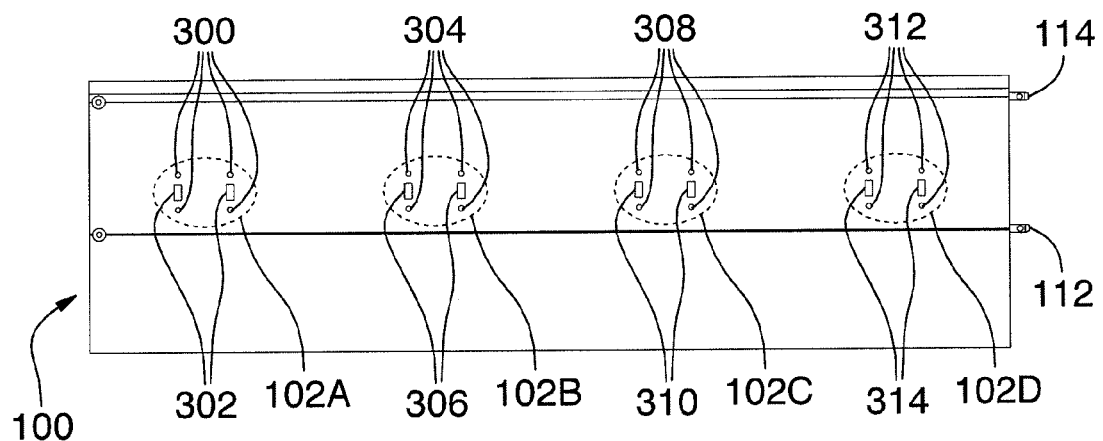
FIG. 3 is a top plan view of the elongated base disclosed in FIG. 1.

Now referring to FIG. 3, there is shown an embodiment of the structure comprising the elongated base 100.

In this illustrated embodiment, the first receiving means 102a comprises a first plurality of holes 300 and a second plurality of holes 302. The first plurality of holes 300 is used for receiving corresponding attaching means from a module to be connected to the first receiving means 102a. In one embodiment, the first plurality of holes 300 comprises four (4) holes located at each end of a rectangle. The second plurality of holes 302 is used for enabling the inserting of an electrical connector between the elongated base 100 and the module to be connected to the first receiving means 102a as further explained below. In one embodiment, the second plurality of holes 302 comprises two (2) holes, each of the two holes being located respectively in the middle of each of the two smaller ends of the rectangle created by the first plurality of holes 300, and each being adapted for enabling insertion of an electrical connector therein.

Similarly, the second receiving means 102b comprises a first plurality of holes 304 and a second plurality of holes 306. The first plurality of holes 304 is used for receiving corresponding attaching means from a module to be connected to the second receiving means 102b. In one embodiment, the first plurality of holes 304 comprises four (4) holes located at each end of a rectangle. The second plurality of holes 306 is used for enabling the inserting of an electrical connector between the elongated base 100 and the module to be connected to the second receiving means 102b as further explained below. In one embodiment, the second plurality of holes 306 comprises two (2) holes, each of the two holes being located respectively in the middle of each of the two smaller ends of the rectangle created by the first plurality of holes 304.

Similarly, the third receiving means 102c comprises a first plurality of holes 308 and a second plurality of holes 310. The first plurality of holes 308 is used for receiving corresponding attaching means from a module to be connected to the third receiving means 102c. In one embodiment, the first plurality of holes 308 comprises four (4) holes located at each end of a rectangle. The second plurality of holes 310 is used for enabling the inserting of an electrical connector between the elongated base 100 and the module to be connected to the third receiving means 102c as further explained below. In one embodiment, the second plurality of holes 310 comprises two (2) holes, each of the two holes being located respectively in the middle of each of the two smaller ends of the rectangle created by the first plurality of holes 308.

Similarly, the fourth receiving means 102d comprises a first plurality of holes 312 and a second plurality of holes 314. The first plurality of holes 312 is used for receiving corresponding attaching means from a module to be connected to the fourth receiving means 102d. In one embodiment, the first plurality of holes 312 comprises four (4) holes located at each end of a rectangle. The second plurality of holes 314 is used for enabling the inserting of an electrical connector between the elongated base 100 and the module to be connected to the fourth receiving means 102d as further explained below. In one embodiment, the second plurality of holes 314 comprises two (2) holes, each of the two holes being located respectively in the middle of each of the two smaller ends of the rectangle created by the first plurality of holes 312.

The skilled addressee will appreciate that various geometric configurations may be envisaged for the holes used for receiving the attaching means from a module to be connected thereto. The skilled addressee will also appreciate that a symmetric configuration of each set of holes may be particularly advantageous since it would enable the mounting of each module in two opposed directions, as it will be more clearly detailed thereinafter.

Figure 4:
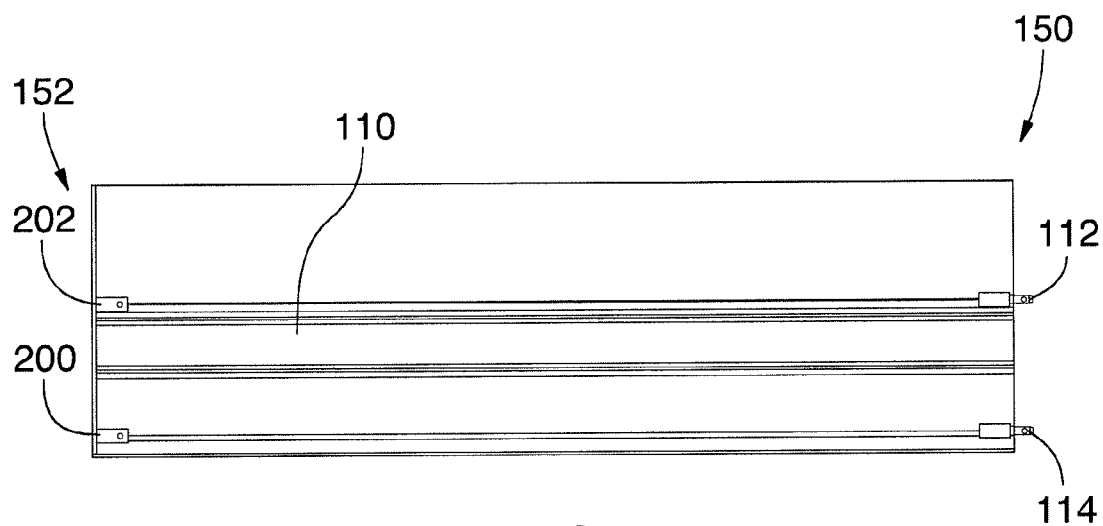
FIG. 4 is a bottom plan view of the elongated base disclosed in FIG. 1.
Figure 5:
FIG. 5 is a front elevation view of the elongated base disclosed in FIG. 1.
Figure 6:
FIG. 6 is a rear elevation view of the elongated base disclosed in FIG. 1.
Figure 7:
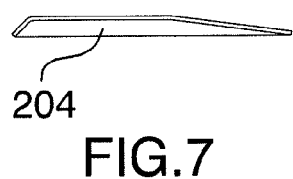
FIG. 7 is a left side view of the elongated base disclosed in FIG. 1.
Figure 8:
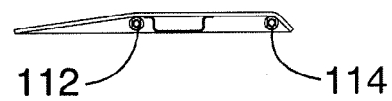
FIG. 8 is a right side view of the elongated base disclosed in FIG. 1.

Now referring to FIG. 4, there is shown an embodiment of the structure comprising the elongated base 100 which shows that the second connecting end cover 204 is abutting the first female connector 202 and the second female connector 200 of the second connecting end 152 of the elongated base 100.

FIGS. 5 to 8 show various views of the structure comprising the elongated base 100.

Figure 9:
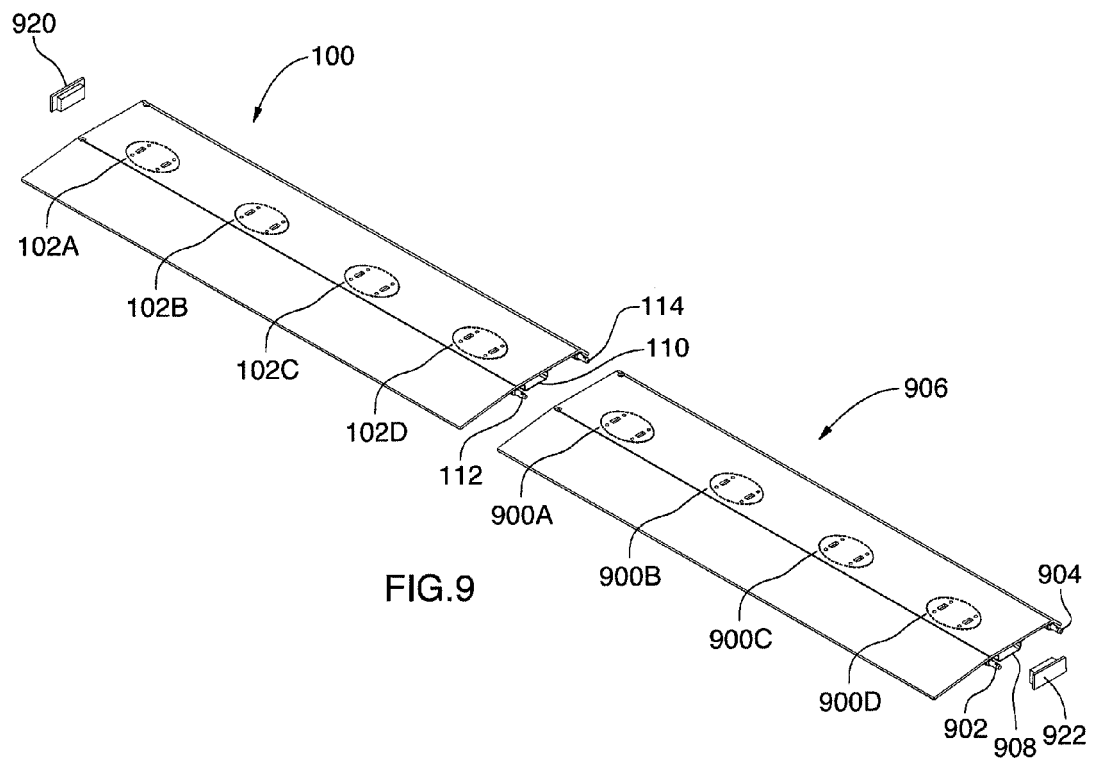
FIG. 9 is a front perspective view of a structure comprising two elongated bases.

Now referring to FIG. 9, there is shown another embodiment of a structure. In this embodiment, the structure comprises the elongated base 100 as well as another elongated base 906. It will be appreciated that this other embodiment of a structure is of great advantage in the case where the use of the elongated base 100 alone is not enough.

The elongated base 100 comprises the first receiving means 102a, the second receiving means 102b, the third receiving means 102c and the fourth receiving means 102d.

A plurality of spaced-apart receiving means 900 is located on the elongated base 906. It will be appreciated that the other elongated base 906 is similar to the elongated base 100. In the embodiment disclosed in FIG. 9, the plurality of spaced-apart receiving means 900 comprises a first receiving means 900a, a second receiving means 900b, a third receiving means 900c and a fourth receiving means 900d. The skilled addressee will further appreciate that while in FIG. 9, the first receiving means 900a, the second receiving means 900b, the third receiving means 900c and the fourth receiving means 900d are aligned, various other configurations are possible. Each of the first receiving means 900a, the second receiving means 900b, the third receiving means 900c and the fourth receiving means 900d is used to connect a module to the elongated base 906. It will be appreciated that each of the plurality of receiving means 900 is similar to each of the plurality of receiving means 102.

Still referring to FIG. 9, the elongated base 900 has a first connecting end and a second connecting end. Each of the first connecting end and the second connecting end may be used to connect the elongated base 900 to another neighboring elongated base to thereby create a structure comprising more than one elongated base.

The first connecting end comprises a first connecting device comprising a first male connector 902 and a second male connector 904, each having a cylindrical shape.

In the illustrated embodiment, the first male connector 902 and the second male connector 904 are extending horizontally and are defining a horizontal surface. In a preferred embodiment, the first male connector 902 and the second male connector 904 are similar to the first male connector 112 and the second male connector 114, and are also each provided with a suitable hole for receiving a screw used for securing the two neighboring bases together.

Still referring to FIG. 9, a wire housing 908 is mounted under the elongated base 906. More precisely, the wire housing 908 is mounted under each of the plurality of spaced-apart receiving means 900 and extends between the first connecting end and the second connecting end of the elongated base 906.

It will be appreciated that in one embodiment end caps 920, 922 are used for sealingly close the wire housing 110 and the wire housing 908. In one embodiment, the wire housing 908 is made of steel or any other material. It may be used like support to fix a waterproof hosing for each connector and to provide a water resistant connection for the input and output for the cable.

Figure 10:
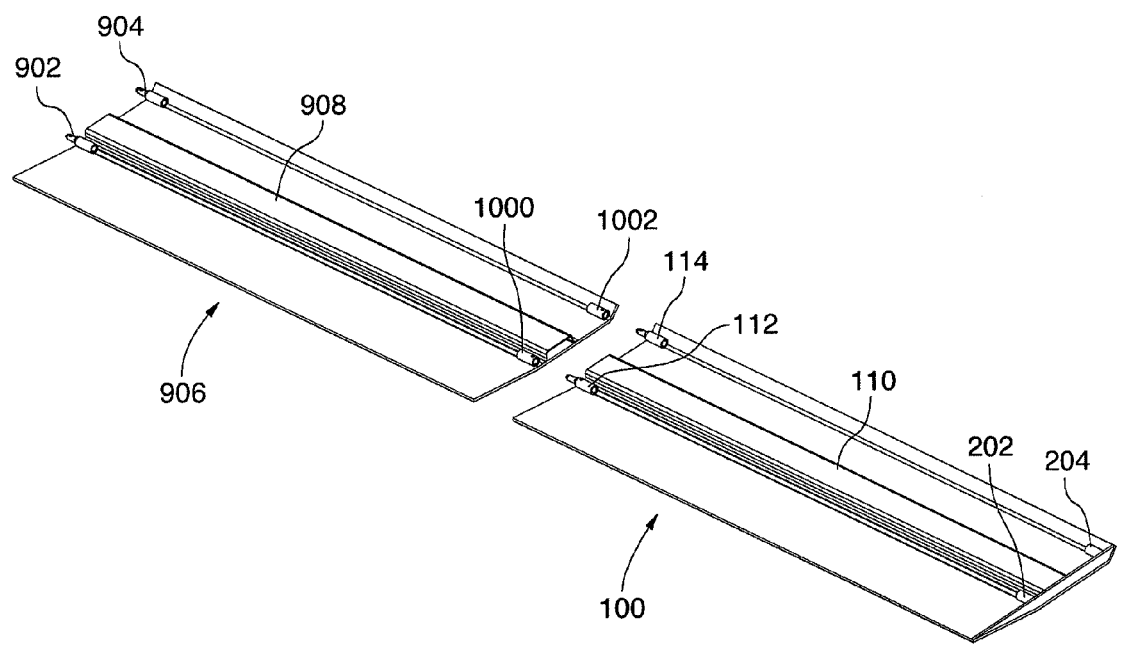
FIG. 10 is a bottom perspective view of the structure comprising two elongated bases of FIG. 9.

FIG. 10 shows a bottom view of the structure comprising the elongated base 100 and the elongated base 906.

The skilled addressee will appreciate that in the embodiment disclosed, the second connecting end of the elongated base 906 comprises a second connecting device having a first female connector 1000 and a second female connector 1002, each having a cylindrical shape.

In the illustrated embodiment, the first female connector 1000 and the second female connector 1002 are extending horizontally and are defining a horizontal surface. Each of the first connecting means 1000 and the second connecting means 1002 is adapted to receive a corresponding male connector from a neighboring elongated base, which in this case is the elongated base 100.

Moreover, it will be appreciated by the skilled addressee that the first female connector 1000 and the second female connector 1002 are positioned facing respectively the first male connector 112 and the second male connector 114 of the elongated base 100.

Figure 11:
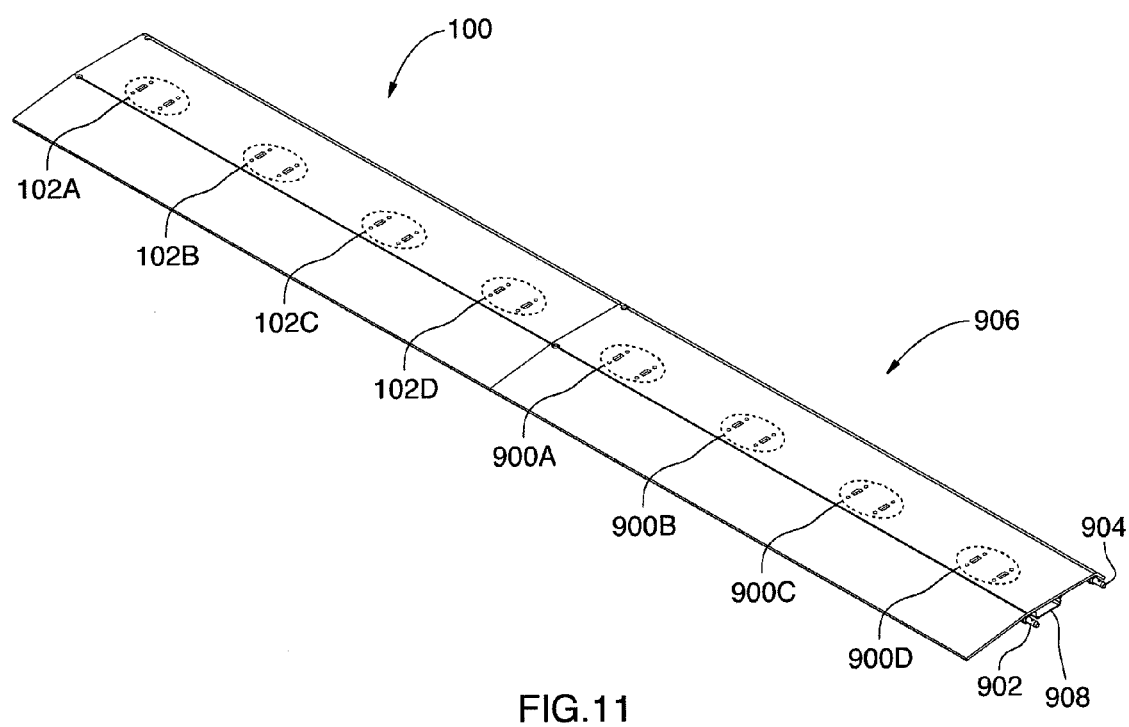
FIG. 11 is a front perspective view of the structure comprising two elongated bases disclosed in FIG. 9 wherein the two elongated bases have been connected together.

Now referring to FIG. 11, there is shown an embodiment where the elongated base 100 and the elongated base 906 have been secured one to another.

The structure resulting from the securing of the elongated base 100 with the elongated base 906 provides a plurality of receiving means comprising the plurality of receiving means 900 and the plurality of receiving means 102. As mentioned previously, the skilled addressee will appreciate that in using this resulting structure, it is possible to easily expand the receiving capability for modules.

Figure 12:
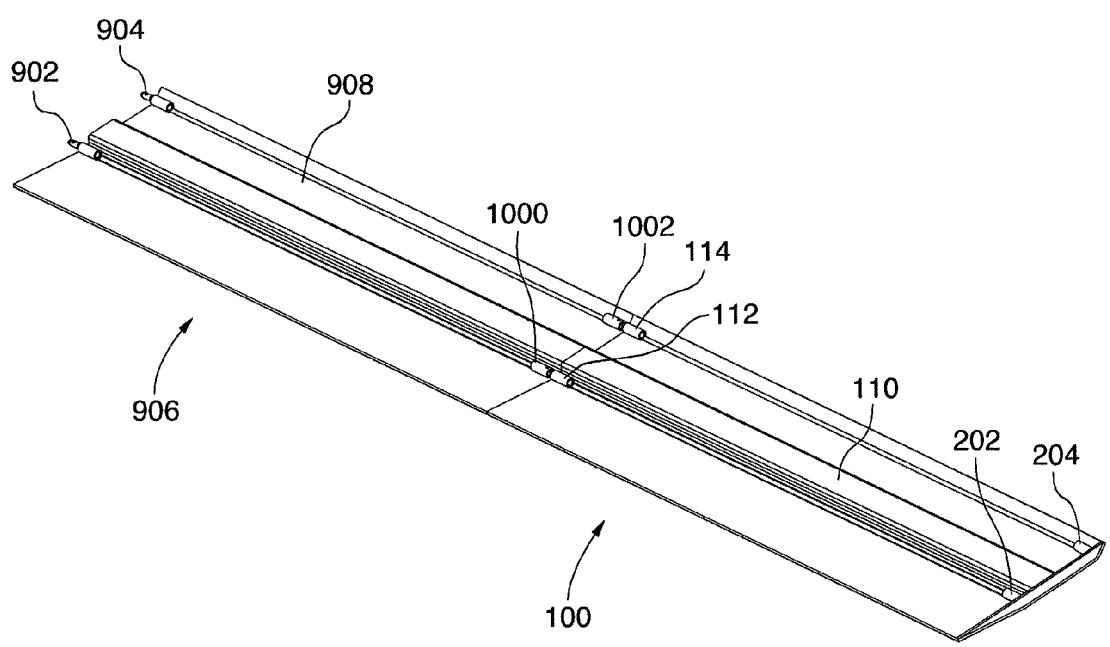
FIG. 12 is a bottom perspective view of the structure disclosed in FIG. 9 wherein the two elongated bases have been connected one to another.

Now referring to FIG. 12, there is shown a bottom view of the structure resulting from the elongated base 100 being secured to the elongated base 906.

The skilled addressee will appreciate that in this embodiment the first male connector 112 of the elongated base 100 is inserted in the first female connector 1000 of the elongated base 906 while the second male connector 114 of the elongated base 100 is inserted in the second female connector 1002 of the elongated base 906.

The skilled addressee will further appreciate that the wire housing 110 and the wire housing 908 are operatively connected, which is of great advantage.

Figure 13:
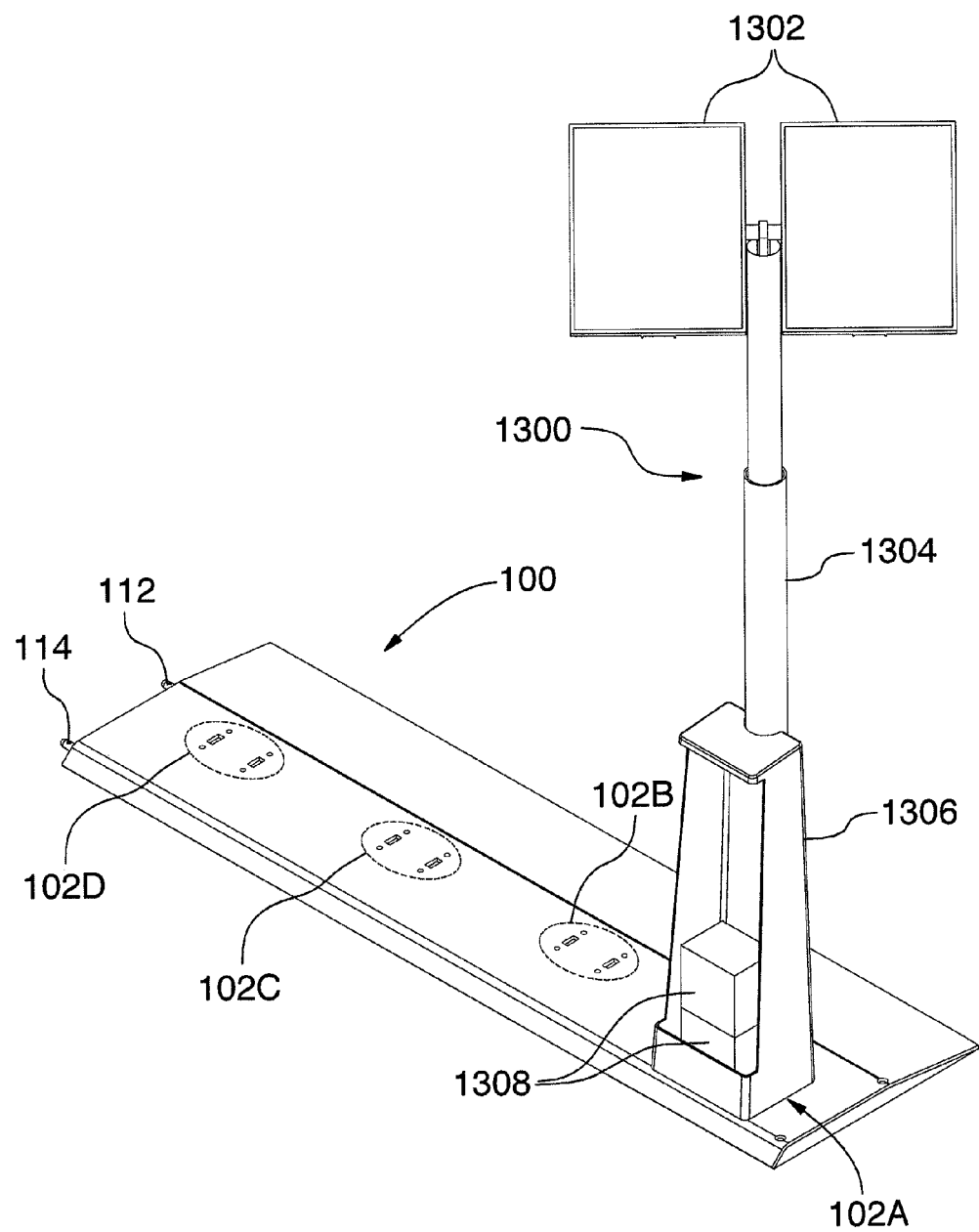
FIG. 13 is a rear perspective view of the elongated base disclosed in FIG. 1, wherein a first embodiment of an energy providing means has been connected thereto.

Now referring to FIG. 13, there is shown an embodiment where the elongated base 100 is advantageously used.

In this embodiment, an integrated solar energy and bicycle providing means 1300 has been installed on the elongated base 100. It will be appreciated that the integrated solar energy and bicycle providing means 1300 has been installed on the first receiving means 102a of the elongated base 100. The skilled addressee will appreciate that the integrated solar energy and bicycle providing means 1300 is of great interest for providing electrical energy as well as for obtaining a bicycle as further explained below.

The integrated solar energy and bicycle providing means 1300 comprises a base 1306, an elongated member 1304 and a solar panel assembly 1302 mounted at the top end of the elongated member 1304. More precisely, it will be appreciated that the integrated solar energy and bicycle providing means 1300 comprises a plurality of batteries 1308, two batteries shown, located within the base 1306. In one embodiment, the base 1306 is made using Munzprufer emp860. The skilled addressee will appreciate that various other embodiments are possible. The solar panel assembly 1302 is mounted on a distal end of the elongated member 1304 while the proximal end of the elongated member 1304 is mounted on the base 1306 of the integrated solar energy and bicycle providing means 1300. The solar panel assembly 1302 is operatively connected to the plurality of batteries 1308 and is used for generating electrical energy using photovoltaic technology.

In one embodiment, the solar panel assembly 1302 is manufactured using SunWize technology (model sc18W-12v). The skilled addressee will appreciate that various other embodiments may be possible. Still in one embodiment, the plurality of batteries 1308 is manufactured using Enerwatt technology (model WP88-12). The skilled addressee will appreciate that various other embodiments may be possible. In one embodiment, the elongated member 1304 and the base 1306 are made of a rigid material known to the one skilled in the art. It will be appreciated that the integrated solar energy and bicycle providing means 1300 is mounted on the first receiving means 102a using attaching means (not shown) comprising an electrical connector (not shown) operatively connected thereto. Moreover, it will be appreciated that the bicycle providing means of the integrated solar energy and bicycle providing means 1300 is not shown. The skilled addressee will appreciate that various other embodiments may be possible.

Figure 13A:
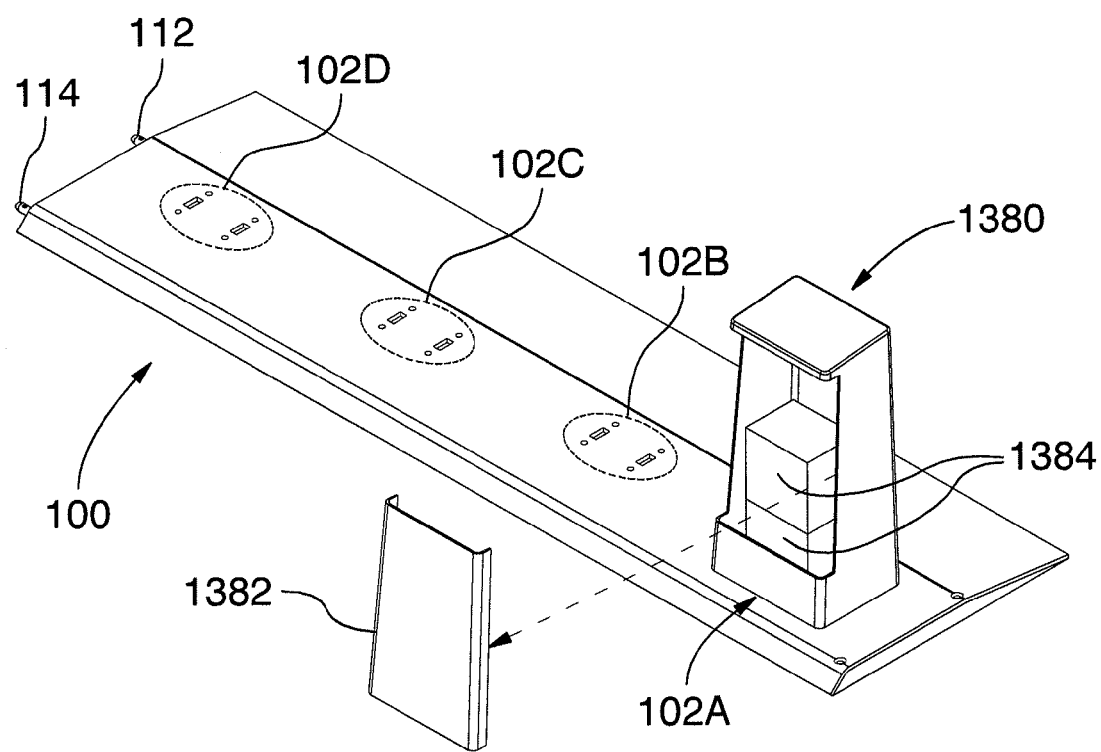
FIG. 13A is a rear perspective view of the elongated base disclosed in FIG. 1 wherein another embodiment of an energy providing means has been connected thereto.

Now referring to FIG. 13A, there is shown another embodiment of a structure comprising the elongated base 100 wherein an energy providing means 1380 has been installed on the elongated base 100.

In this embodiment, the energy providing means 1380 comprises an electrical energy storing unit, an example of which is a plurality of batteries 1384, two being shown.

In one embodiment, the plurality of batteries 1384 is manufactured using Enerwatt technology (model WP88-12). The skilled addressee will appreciate that various other embodiments may be possible.

Still in this embodiment, a cover 1382 is used for selectively accessing the plurality of batteries 1384 of the energy providing means 1380 when required.

In one embodiment, the energy providing means 1380 has a casing made of a rigid material but various other embodiments are possible.

Figure 14:
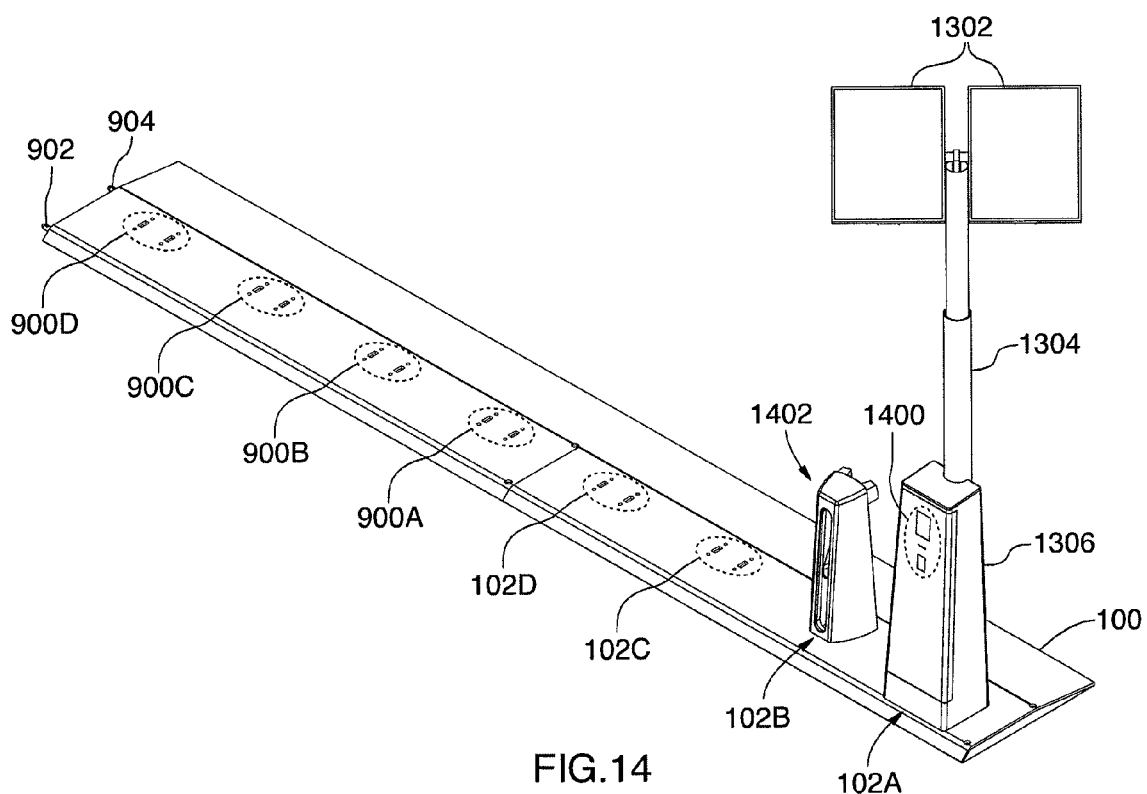
FIG. 14 is a rear perspective view of an assembly of two elongated bases wherein a bicycle rack and an energy providing means have been secured thereto.

Now referring to FIG. 14, there is shown an embodiment of a modular system for providing bicycles at a given location, according to a desired configuration.

More precisely, the modular system comprises a bicycle rack 1402 for storing a bicycle. The bicycle rack 1402 comprises an electronic lock secured thereto for removably securing a corresponding bicycle (not shown). The bicycle rack 1402 further comprises a corresponding attaching means (not shown) having an electrical connector operatively coupled to the electronic lock. The skilled addressee will appreciate that the bicycle rack 1402 has been secured on the second receiving means 102b of the elongated base 100. The bicycle rack 1402 and its electronic lock has been disclosed in co-pending U.S. Provisional Patent Application entitled "Method and apparatus for securing a movable item to a structure", having Ser. No. 61/047,162 that was filed on Apr. 23, 2008, the specification of which is hereby incorporated by reference.

The modular system for providing bicycles at a given location shown in FIG. 14 further comprises the integrated solar energy and bicycle providing means 1300 for providing electrical energy to the electronic lock (not shown) of the bicycle rack 1402. The integrated solar energy and bicycle providing means 1300 comprises a corresponding attaching means having an electrical connector (not shown) operatively coupled thereto. The integrated solar energy and bicycle providing means 1300 has been secured on the first receiving means 102a of the elongated base 100 using its attaching means. It will be appreciated that the integrated solar energy and bicycle providing means 1300 further comprises a user interface 1400 used for controlling the use of the bicycle rack 1402.

It will be further appreciated that the modular system shown in FIG. 14 further comprises an electric network (not shown) interconnecting each of the plurality of spaced-apart receiving means 102a, 102b, 102c, 102d, 900a, 900b, 900c and 900d of the two elongated connected bases. The skilled addressee will therefore appreciate that the integrated solar energy and bicycle providing means 1300 and the bicycle rack 1402 are operatively coupled using the electric network. The electric network is used to distribute electricity to each element coupled to the electric network. The electric network may further be used to share communication data between elements connected to the elongated base. The skilled addressee will appreciate that this is of great advantage since in this embodiment, the modular system does not require any additional source of energy aside the integrated solar energy and bicycle providing means 1300. In other words, the use of solar energy is of great advantage since it enables a stand-alone use of the system.

Figure 15:
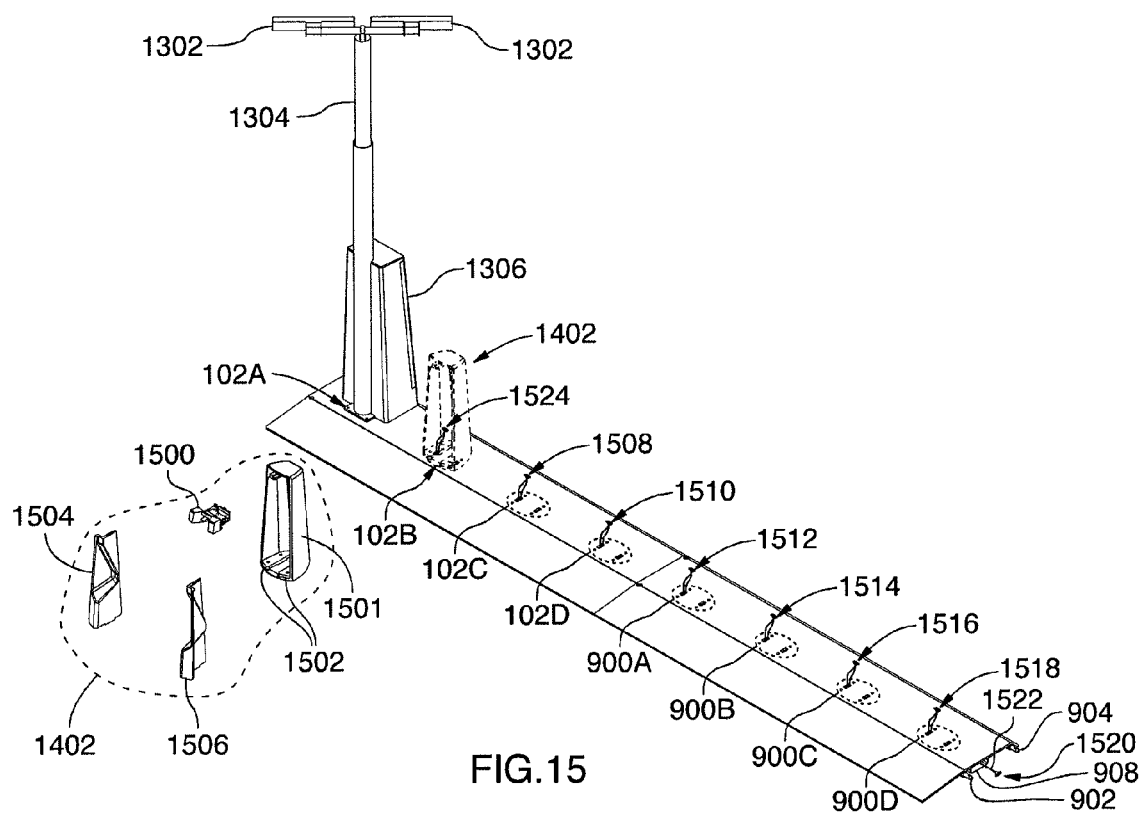
FIG. 15 is a front perspective view of a structure comprising two elongated bases wherein an energy providing means has been connected thereto and wherein a bicycle rack is shown in exploded view.

Now referring to FIG. 15, there is shown another view of the modular system disclosed in FIG. 14. In this embodiment, there is shown that the bicycle rack 1402 comprises a casing 1501 comprising attaching means 1502. The bicycle rack 1402 further comprises the electronic lock 1500, a first molded assembly 1504 and a second molded assembly 1506.

As shown in FIG. 15, a first connector 1526 (not shown) is used for operatively coupling the integrated solar energy and bicycle providing means 1300 to an electric network; a second connector 1524 is used for operatively coupling the bicycle rack 1402 to the electric network; a third connector 1508 is used for operatively coupling a module secured to the third receiving means 102*c* to the electric network. A fourth connector 1510 is used for operatively coupling a module secured to the fourth receiving means 102*d* to the electric network; a fifth connector 1512 is used for operatively coupling a module secured to the receiving means 900*a*; a sixth connector 1514 is used for operatively coupling a module secured to the receiving means 900*b*; a seventh connector 1516 is used for operatively coupling a module secured to the receiving means 900*c* and a eighth connector 1518 is used for operatively coupling a module secured to the receiving means 900*d*.

It will be further appreciated that an optional connector 1522 is provided for coupling a neighboring electric network of a neighboring elongated base to the electric network.

Figure 16:
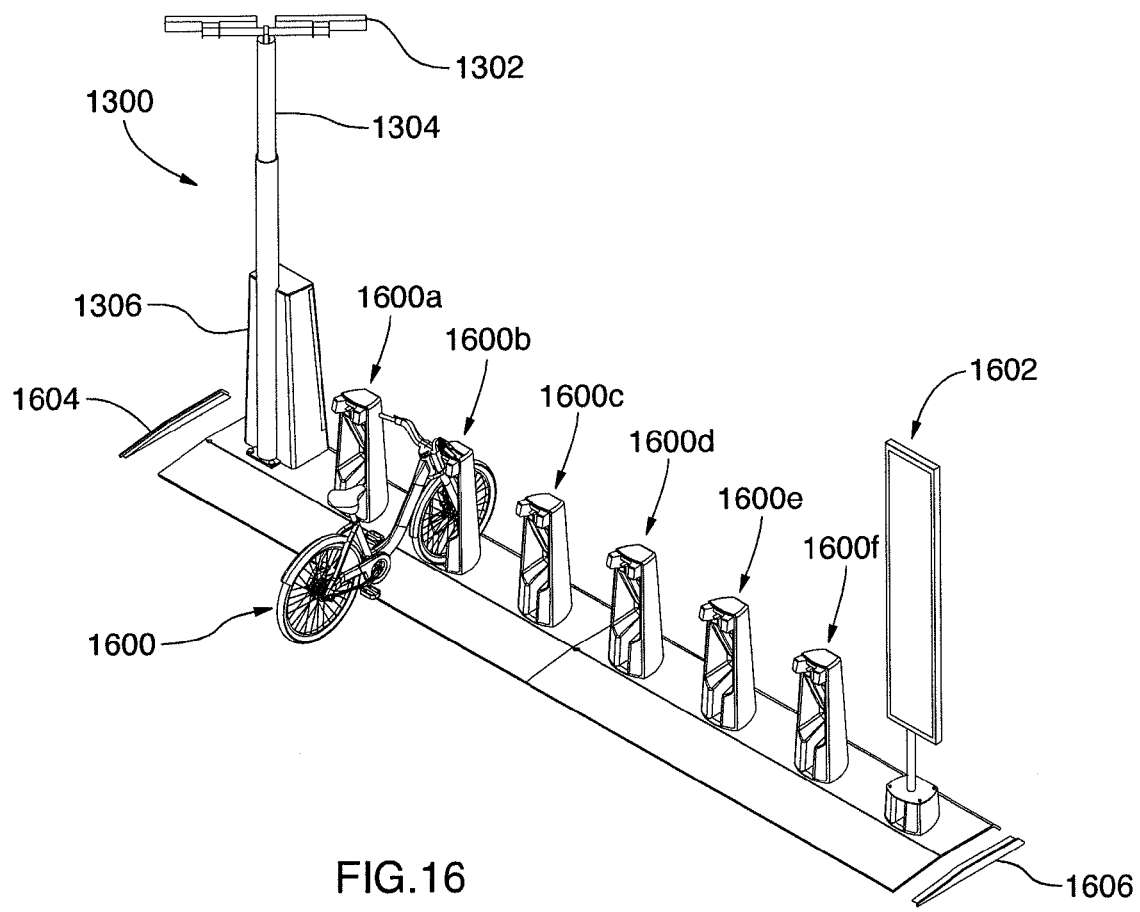
FIG. 16 is a front perspective view of a structure comprising two elongated bases that have been connected one to another and further a plurality of bicycle racks together as well as an integrated solar energy and bicycle providing means have been installed on the structure.

Now referring to FIG. 16, there is shown another embodiment of a modular system for providing bicycles.

In this embodiment, the modular system for providing bicycles comprises the integrated solar energy and bicycle providing means 1300. The modular system for providing bicycles further comprises six (6) bicycle racks, respectively 1600*a*, 1600*b*, 1600*c*, 1600*d*, 1600*e*, 1600*f*, and an advertisement module 1602, each being secured to a corresponding receiving means of a plurality of receiving means located on two elongated bases secured together. Each of the plurality of bicycle racks 1600*a* to 1600*f* is similar to the bicycle rack 1402.

The skilled addressee will further appreciate that each of the plurality of bicycle racks 1600*a* to 1600*f* as well as the advertisement module 1602 is operatively connected to the integrated solar energy and bicycle providing means 1300 via the electric network.

Moreover, the skilled addressee will also appreciate that a receiving means cover (not shown) may be used to cover a location where no module is installed.

As previously mentioned with reference to FIG. 2, first and second end covers 1604 and 1606 are used for sealingly covering each extremity of the assembly.

Figure 17:
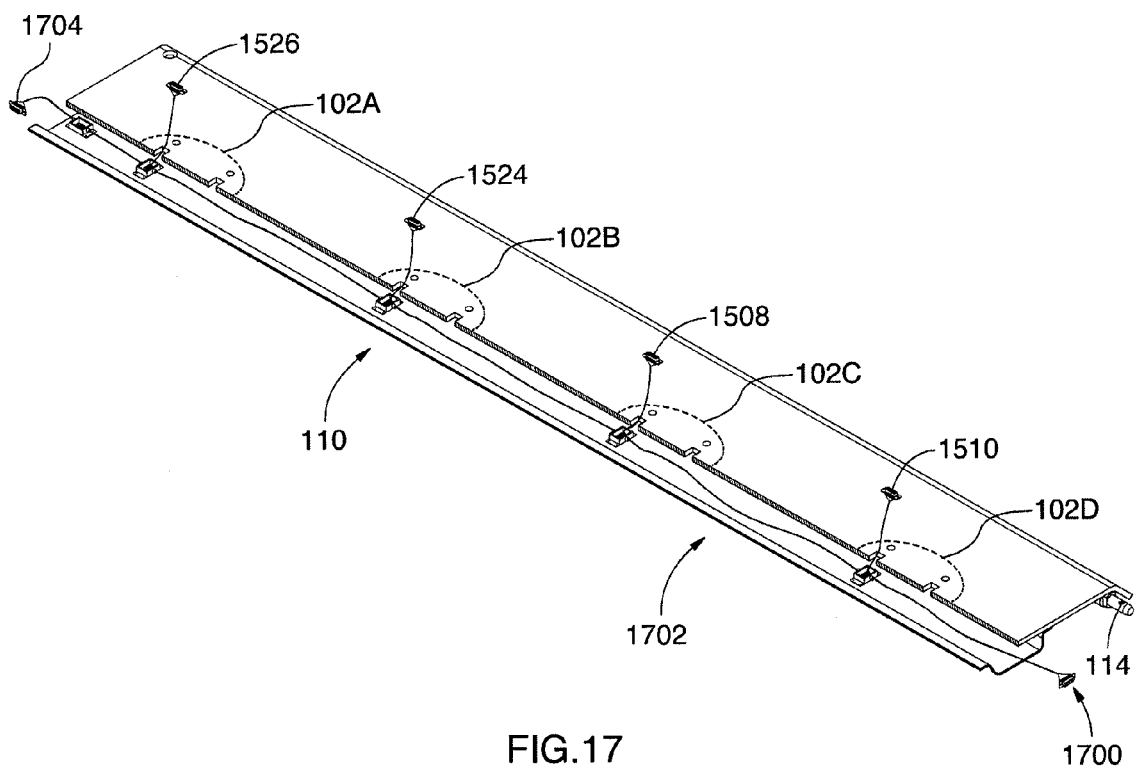
FIG. 17 is a front perspective view, cross-sectioned longitudinally of the elongated base shown in FIG. 1 wherein an electric network has been inserted therein.

Now referring to FIG. 17, there is shown how the electric network interconnecting each element mounted on a corresponding one of the plurality of spaced-apart receiving means is installed according to one embodiment.

More precisely, the electric network 1702 comprises a first optional connector 1700 for connecting the electric network 1702 to the electric network of a neighboring elongated base if required. It will be appreciated by the skilled addressee that the first optional connector 1700 is installed in the wire housing 110 of the elongated base 100.

The electric network 1702 further comprises a second optional connector 1704 for connecting the electric network 1702 to another electric network of another neighboring elongated base if required. Similarly, it will be appreciated by the skilled addressee that the second optional connector 1704 is located in the wire housing 110 of the elongated base 100.

The first connector 1526 is used for operatively coupling a module secured to the first receiving means 102*a*, while the second connector 1524 is used for operatively coupling a module secured to the second receiving means 102*b* and the third connector 1508 is used for operatively coupling a module secured to the third receiving means 102*c* and the fourth connector 1510 is used for operatively coupling a module secured to the fourth receiving means 102*d*.

It will be appreciated by the skilled addressee that while in the embodiment disclosed in FIG. 17, the first connector 1526, the second connector 1524, the third connector 1508, the fourth connector 1510, the first optional connector 1700 and the second optional connector 1704 are connected together using a daisy chain configuration, various other embodiments may be provided. In one embodiment, the connectors 1526, 1524, 1508, 1510, 1700 and 1704 may be connected in a serial configuration while, in another embodiment, they may be connected in a parallel configuration. Moreover, and in a preferred embodiment, the electric network is adapted for providing electricity as well as communication data using the plurality of receiving means.

In one embodiment, each of the second optional connector 1704, the first connector 1526, the second connector 1524, the third connector 1508 and the fourth connector 1510 is installed in a box such as a closed-bottom 2 cable glands provided by Revos. Each box is secured to a corresponding wire housing. Moreover, and in one embodiment, each of the first connector 1526, the second connector 1524, the third connector 1508 and the fourth connector 1510 is a female connector provided in one embodiment by Revos (6/6 pole+ground). Still in one embodiment, the first optional connector 1700 comprises a male connector provided in one embodiment by Revos (6/6 pole+ground) while the second optional connector 1704 is a female connector provided in one embodiment by Revos (6/6 pole+ground). The skilled addressee will appreciate that various other arrangements may be considered.

It will be further appreciated that in one embodiment each connector to be connected to a corresponding connector of the first connector 1526, the second connector 1524, the third connector 1508 and the fourth connector 1510, as well as the first optional connector 1700, comprises a corresponding male connector provided in this embodiment by Revos (6/6 pole+ground). It will be appreciated that in this embodiment, the connector is embedded in a data cable feed-through with one or two brushings such as the ones provided by Revos. The skilled addressee will appreciate that various other embodiments may be possible.

It will be appreciated that the system may receive other types of modules.

For instance, the system may receive a servicing module for using the system, an example of which is a payment module used for renting a bicycle of the system. This module may be used for instance by a user that has not been registered to the system yet. Using this module, the user may perform a payment on the payment module and receive an authorization code that may then be entered at one of the plurality of bicycle racks. In such embodiment, the payment module comprises means for communicating with the at least one bicycle rack. It will be appreciated that the means for communicating with the at least one bicycle rack comprises one of wired means and wireless means. In a preferred embodiment, the means for communicating with the at least one bicycle rack comprises a data network interface operating according to the RS485 or I2C protocol. Still in this embodiment, the system comprises a data network integrated in the electric network interconnecting each of the plurality of spaced-apart receiving means. The data network interface is operatively connected to the data network using an electrical connector. It will also be appreciated that the payment module may comprise means for communicating with a distant server in the case where a credit card or a debit card is used to perform the payment. In a preferred embodiment, the means for communicating to the distant server comprises a wireless communication interface.

Another type of module that may be connected to the system is a module for providing a good to a user, an example of which is a vending machine. It will be appreciated that various types of vending machines may be used such as vending machines for providing snacks, candies, beverages as well as other products to consumers. Subject to local legislations, the module may be used to provide products such as cigarettes and alcohol. In such embodiment, the module for providing a good to a user comprises attaching means having an electrical connector operatively coupled to the module. The module for providing a good to a user is secured to the system by connecting the attaching means to one of the plurality of receiving means located on the elongated base.

A further type of module may be a module for providing information to a user, an example of which is an advertisement module comprising a display device. It will be appreciated that the display device may be of various types such as for instance a plasma display panel or a liquid crystal display (LCD). Alternatively, the display device may comprise a static advertisement panel. The skilled addressee will appreciate that the module for providing information to a user may be of various shapes and configurations depending on an intended use. In such embodiment the module for providing information to a user comprises attaching means having a connector operatively coupled to the module. The module for providing information to a user is secured to the system by connecting the attaching means to one of the plurality of receiving means located on the base according to a desired configuration.

It will be appreciated by the skilled addressee that the modular system disclosed herein is of great advantage since it enables an operator to provide a system for providing bicycles, as well as other services or goods using the above described modules, according to a desired configuration. The desired configuration for a given system may be selected by the operator according to various criteria such as for instance, a number of existing or forecast users for the system, a surrounding environment of the system, an availability of resources such as electricity, environmental considerations such as temperature or the like. Moreover, end-user needs other than the ones related to bicycle stricto sensu, may be taken in consideration for determining the desired configuration.

Moreover, the skilled addressee will appreciate that such system is of great advantage since defective components may be easily replaced by operating ones thanks to its modularity. In such case, the defective components may be fixed later off site. The skilled addressee will appreciate that this is of great advantage for both the operator and the users since it reduces the duration of unplanned downtime operations. The skilled addressee will appreciate that this can translate into a decrease of losses dues to the unplanned downtime operations.

Furthermore, the skilled addressee will appreciate that such system may be of great advantage in the case of non permanent events such as outdoor festivals or outdoor events in general. In such embodiment, such system may be installed at selected places on the site of the event. The location where the system may be installed may be selected depending on various criteria. Moreover, the configuration per se of the system may be fully adapted according to various considerations such as ornamental considerations, economic consideration or the like. In particular, it will be appreciated that new modules adapted to a given situation may be added to the system. For instance and as explained above, a vending machine may be operatively connected to the elongated base of the system using one of the receiving means. Alternatively, a ticket distribution booth may be operatively connected to the elongated base of the system using one of the receiving means.

In a further embodiment, the free connecting ends of a structure comprising at least one elongated base may also be used for attaching other types of modules thereto. For example, an upright panel having a bottom part similar to the end covers 1604, 1606 may be considered for providing additional information space or advertising space.

The skilled addressee will appreciate that in one embodiment an adaptor may be provided for securing future modules to the securing means. The adaptor may be secured to the bottom end of the module to install. The adaptor may comprise an attaching means which is adapted to be secured to the attaching means of a corresponding receiving means of the elongated base as well as connectors if required.

Figure 18:
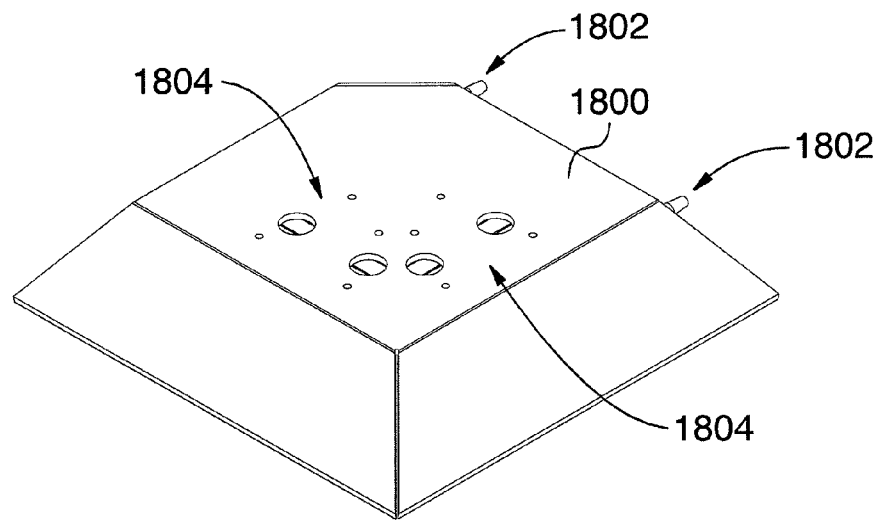
FIG. 18 is a front perspective view of an interconnecting element used for interconnecting two elongated bases together.
Figure 19:
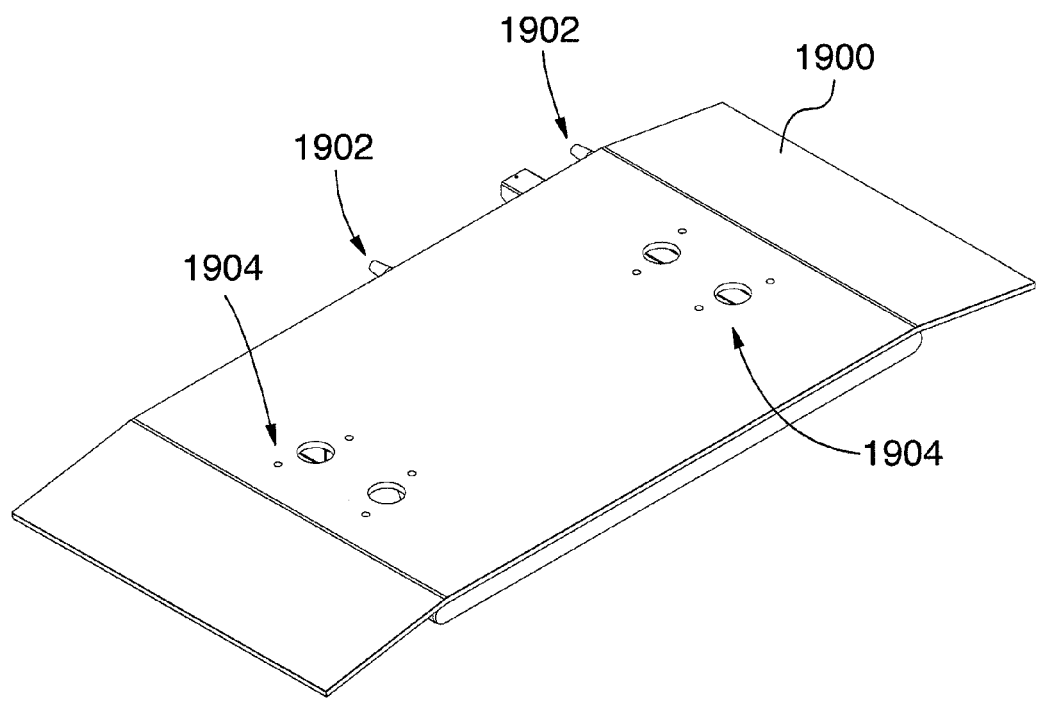
FIG. 19 is a front perspective view of another interconnecting element used for interconnecting two elongated bases together.

Now referring to FIGS. 18 and 19, there is shown two different embodiments of an interconnecting element 1800 and 1900 for interconnecting at least two elongated bases together. Each of these interconnecting elements 1800, 1900 comprises at least one end suitable for connecting an elongated base thereto. In one embodiment, the end suitable for connecting an elongated base thereto comprises a connecting device 1802 or 1902 adapted for connecting with the connecting device of an elongated base. The connecting device of the interconnecting element 1800 or 1900 may comprise a pair of female connectors or a pair of male connectors as described above.

Figure 20A:
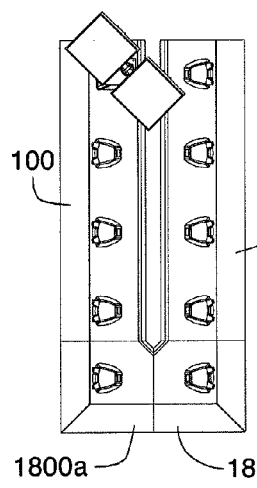
FIGS. 20A to 20E are top plan views of different structures comprising at least two elongated bases interconnected together with at least one interconnected element.
Figure 20B:
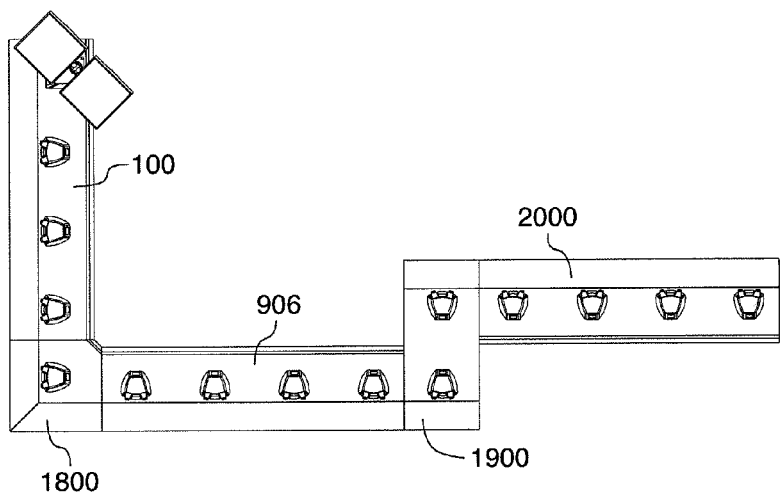
Figures 20C, 20D, 20E:
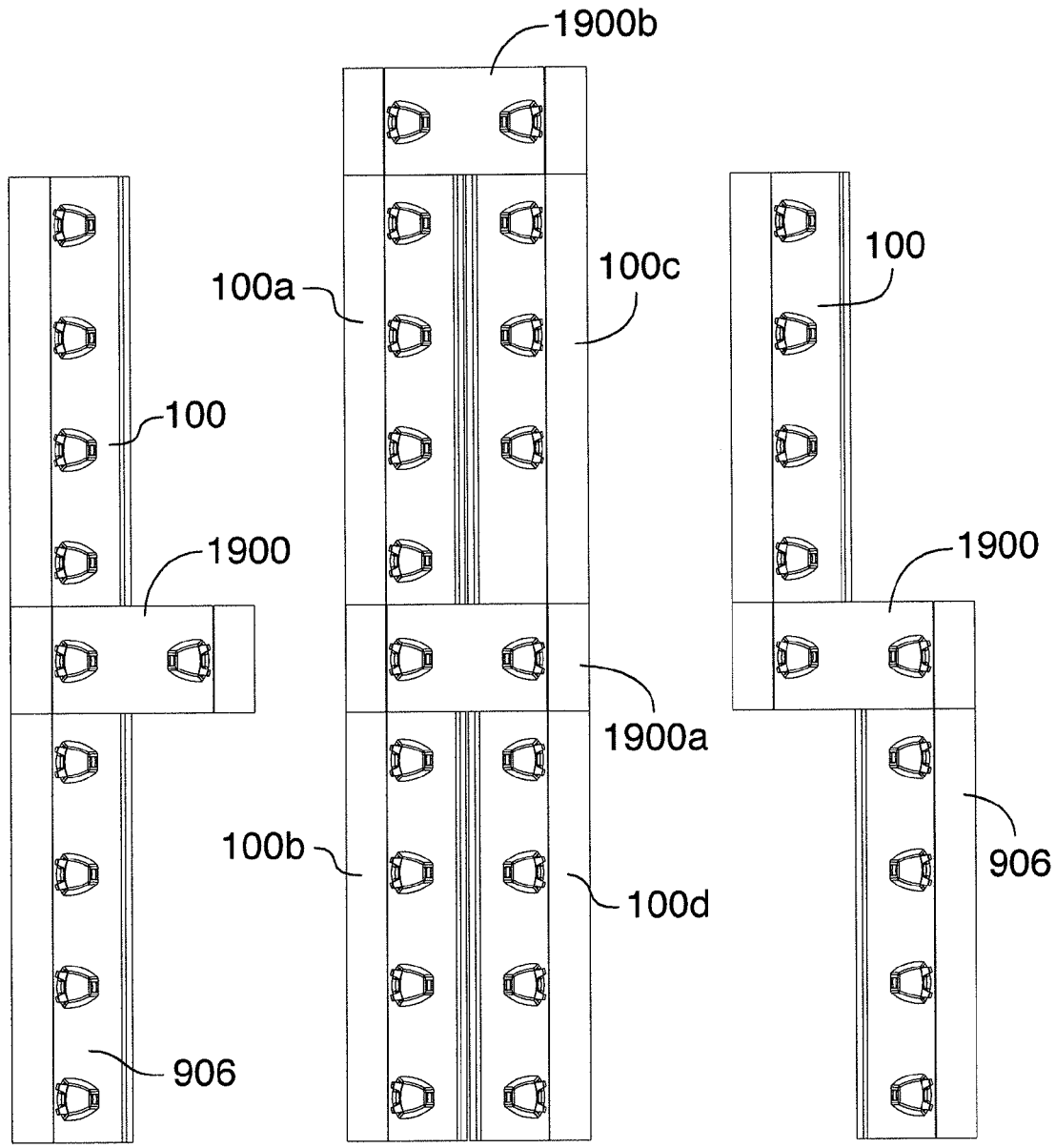

Now referring to FIGS. 20A to 20E, there are shown five different configurations of a modular system for providing bicycles which use at least one of the interconnecting elements shown in FIGS. 18 and 19. In FIG. 20A, the configuration comprises two elongated bases 100, 906 and two interconnecting elements 1800*a* and 1800*b* shown in FIG. 18 mounted in a U-shaped configuration. In FIG. 20B, the configuration comprises three elongated bases 100, 906, 2000 interconnected together with a first interconnecting element 1800 shown in FIG. 18 and a second interconnecting element 1900 shown in FIG. 19. In FIG. 20C, the configuration comprises two elongated bases 100, 906 connected to each other through an interconnecting element 1900. In FIG. 20D, the configuration comprises two pairs of elongated bases 100*a*, 100*b*, 100*c*, 100*d* mounted face to face, a first interconnecting element 1900*a* mounted between the two pairs of elongated bases and a second interconnecting element 1900*b* mounted at an end of a pair of elongated bases. In FIG. 20E, the configuration comprises two elongated bases 100, 906 and an interconnecting element 1900 mounted therebetween. The skilled addressee will appreciate that the interconnecting elements 1800 and 1900 shown in FIGS. 18 and 19 may be of great advantage for providing a particular configuration according to specific needs. The skilled addressee will also appreciate that various other configurations may be envisaged for the interconnecting elements. For example, an interconnecting element provided with four sides, each being provided with a corresponding connecting device may be considered for mounting a plurality of bases in a star configuration.

Still referring to FIGS. 20A to 20E and also to FIGS. 18 and 19, the interconnecting elements 1800 and 1900 may be used for attaching additional modules, which is of great advantage. In one embodiment, the interconnecting element 1800 may be provided with receiving means 1804 adapted for receiving a selected attaching means of a bicycle rack or an energy providing means or any other type of module. In the embodiment illustrated in FIG. 19, two receiving means 1904 are provided for receiving two additional modules (not shown) in a face to face configuration. In the embodiment illustrated in FIG. 18, two receiving means 1804 are provided for mounting a single module in a first orientation or in another orientation perpendicular to the first configuration. The skilled addressee will note that the embodiments of the receiving means illustrated in FIGS. 18 and 19 are different from the embodiment of the receiving means illustrated in FIG. 1, even if they may be similar.

As previously mentioned, in a preferred embodiment, the receiving means are adapted for mounting a module thereon in either a first direction or either a second direction opposed to the first direction. This provides additional flexibility to the modular system.

Referring again to FIG. 16, the skilled addressee will appreciate that the structure is substantially flat, which is of great advantage since it enables a user to pass through the structure without requiring getting round the whole system. This is of great advantage in the case a large structure is needed.

The skilled addressee will appreciate that, in a further embodiment, the structure may comprise a set of adjustable leveling screws mounted under the elongated base for enabling a leveling of the structure. This feature is of great advantage in the case the structure is installed on an inclined surface.

Figure 21:
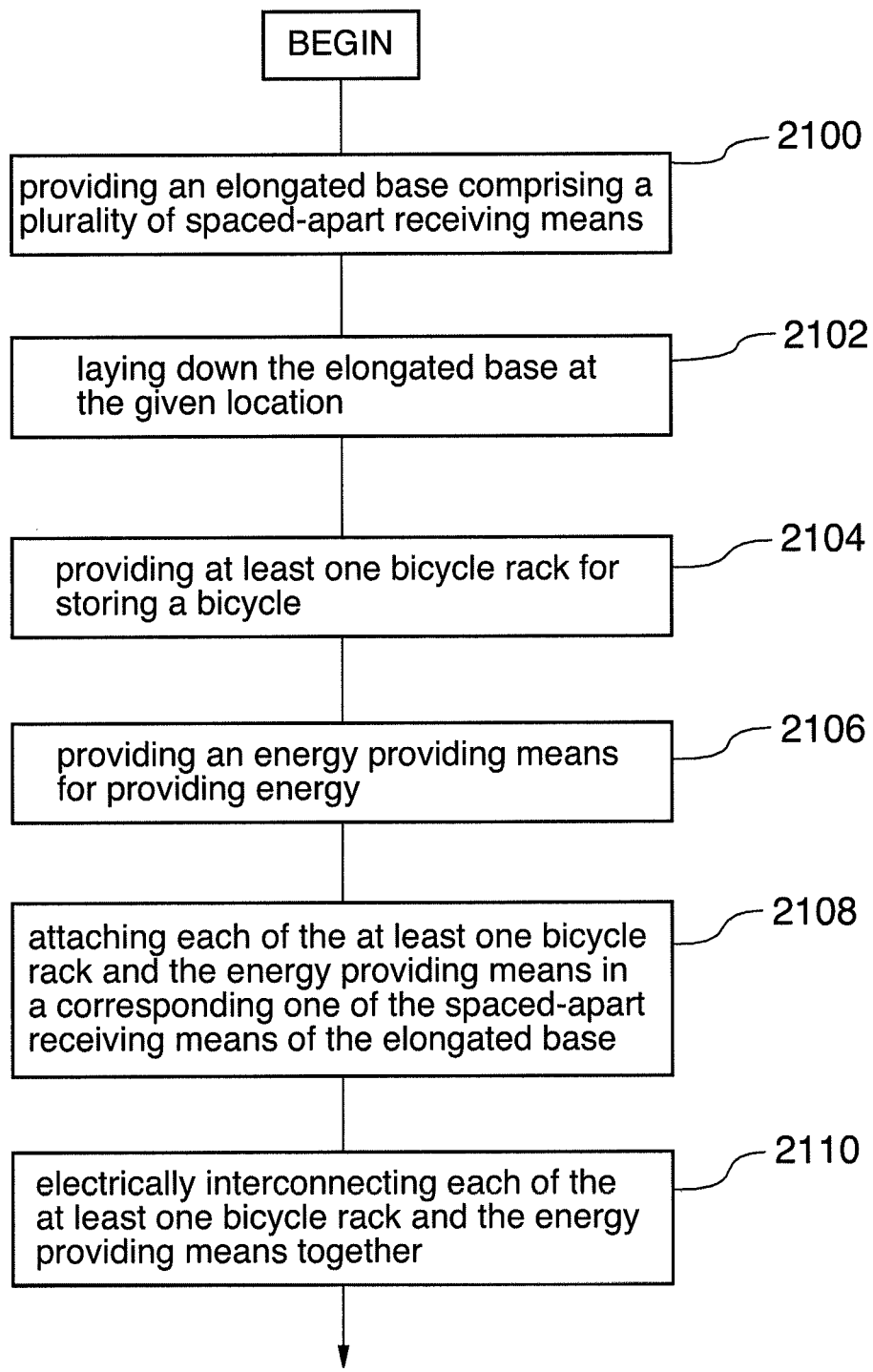
FIG. 21 is a flow chart of a method of installing a modular system for providing bicycles at a given location according to a desired configuration.

Now referring to FIG. 21, there is shown a flow chart of a method for installing a modular system for providing bicycles at a given location according to a desired configuration.

According to step 2100, an elongated base comprising a plurality of spaced-apart receiving means is provided.

According to step 2102, the elongated base is laid down at the given location.

According to step 2104, at least one bicycle rack for storing a bicycle is provided. Each of the bicycle rack comprises an electronic lock secured thereto for removably securing a corresponding bicycle.

According to step 2106, an energy providing means is provided for providing energy.

According to step 2108, each of the at least one bicycle rack and the energy providing means is attached in a corresponding one of the spaced-apart receiving means of the elongated base.

According to step 2110, each of the at least one bicycle rack and the energy providing means are electrically interconnected together.

In a further embodiment of the method for installing a modular system as previously described, at least one additional elongated base comprising a plurality of spaced-apart receiving means is provided. Each of the additional elongated bases is laid down at the given location proximate the elongated base. The first additional elongated base is operatively connected to an end of the elongated base and the remaining additional elongated bases are connected to a free end of one of the elongated bases. The skilled addressee will appreciate that the interconnecting elements shown in FIGS. 18 and 19 may be used for installing the modular system according to a specific configuration.

As previously mentioned, in one embodiment, the given location is selected from a group consisting of a sidewalk, a portion of a street, a parking lot, a park, a beach and a substantially horizontal surface. The skilled addressee will appreciate that various other locations may be considered.

In a further embodiment of the method, the desired configuration comprises an initial predetermined configuration defined according to an intended use. The method comprises the step of monitoring use of the bicycles for providing current usage information based on the initial predetermined configuration. An optimal configuration for the modular system is then defined based on the current usage information, the optimal configuration comprising an optimal number of the bicycles and the associated bicycle racks and a corresponding number of elongated bases. According to this embodiment, the modular system is then configured according to the optimal configuration.

The above mentioned step of configuring according to the optimal configuration comprises providing the corresponding number of elongated bases; laying down the corresponding number of elongated bases at the given location; operatively connecting each of the corresponding number of elongated bases together; providing the optimal number of the bicycles and the associated bicycle racks; attaching each of the optimal number of bicycle racks in a corresponding one of the spaced-apart receiving means of a corresponding one of the elongated bases; and electrically interconnecting each of the optimal number of bicycle racks and the energy providing means together.

In one embodiment, the current usage information comprises a bicycle occupation rate associated with each of the bicycles. The skilled addressee will appreciate that various other parameters may be taken into consideration for defining the optimal configuration.

Figure 22:
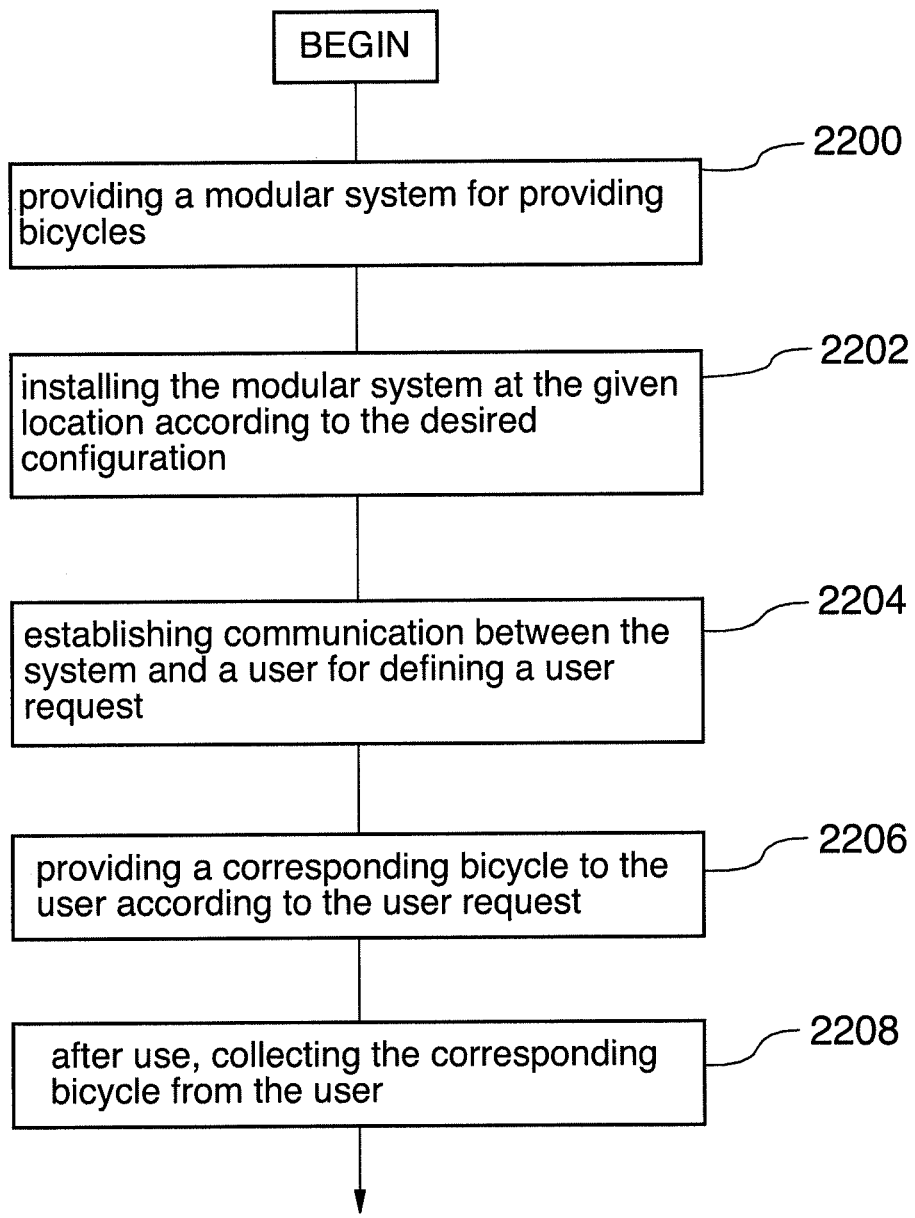
FIG. 22 is a flow chart of a method for providing bicycles at a given location according to a desired configuration.

Now referring to FIG. 22, there is shown a flow chart of a method for providing bicycles at a given location according to a desired configuration.

According to step 2200, a modular system, as previously described, is provided.

According to step 2202, the modular system is installed at the given location according to the desired configuration.

According to step 2204, communication between the system and a user is established for defining a user request.

According to step 2206, a corresponding bicycle is provided to the user according to the user request.

According to step 2208, the corresponding bicycle is collected from the user after use.

In one embodiment, the collecting is performed at another location provided with another modular system, which is of great advantage for a user.

In another embodiment, the providing of a corresponding bicycle is done for a fee, as it will be more detailed thereinafter.

Figure 23:
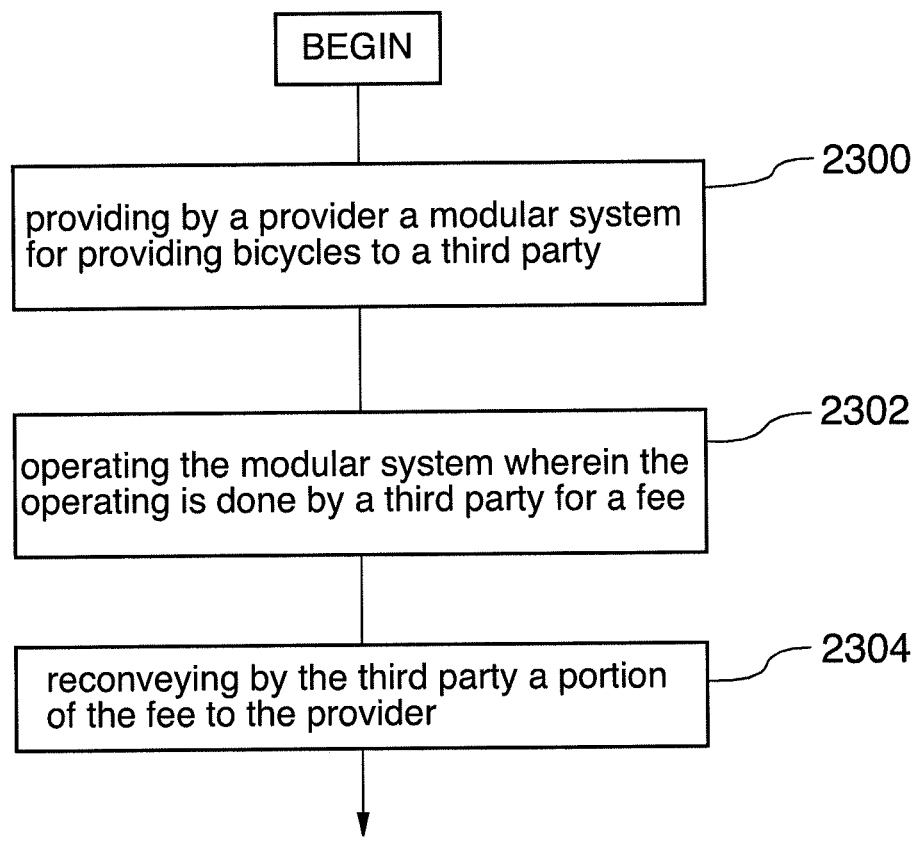
FIG. 23 is a flow chart of a method of doing business with the providing of bicycles at a given location according to a desired configuration.

Now referring to FIG. 23, there is shown a flow chart of a method of doing business in providing bicycles at a given location according to a desired configuration.

According to step 2300, a third party is provided by a provider with a modular system as previously described.

According to step 2302, the modular system is operated by a third party for a fee.

According to step 2304, the third party reconveys a portion of the fee to the provider.

In one embodiment, the fee is determined according to an occupation rate associated to each of the corresponding bicycles.

It will be appreciated that the system described herein may be operated by the owner of the system. Alternatively, the system may be operated by a third party for a fee. In one embodiment, the fee may be a share of the revenues while in an alternative embodiment, the fee may comprise a fixed fees. It will be appreciated by the skilled addressee that such system may be used in two separate geographic locations depending on weather conditions. For instance, the system may be installed at a first location during a first part of the year while it is then installed to a second location during a second part of the year. The skilled addressee will appreciate that this is of great advantage since it helps maximizing the revenues originating from the system.

Moreover, it will be further appreciated that the system may be easily upgraded since it is modular. For instance, the design of the bicycle rack may be upgraded easily and this does not require changing the whole system, which is of great advantage. In particular, the design of the bicycle rack may be different depending on a location where the system is provided.

Moreover, the modular system may be installed at any particular location without requiring complex installation steps such as providing anchoring holes in the ground. Indeed, as explained above, in a preferred embodiment, the structure and the bicycle racks are made of a rigid and heavy material such as steel for providing to the system an appropriate weight that provides sufficient stability to the system. In others words, the system remains in place under the gravity effect without any ground anchoring.

Although the above description relates to a specific preferred embodiment as presently contemplated by the inventor, it will be understood that the invention in its broad aspect includes mechanical and functional equivalents of the elements described herein.

What is claimed is:

1. A modular system for providing bicycles at a given location according to a desired configuration, the modular system comprising:
    at least one bicycle rack for storing a bicycle, each of said at least one bicycle rack comprising an electronic lock secured thereto for removably securing a corresponding bicycle, each of the at least one bicycle rack further comprising a corresponding attaching means having an electrical connector operatively coupled to the electronic lock;
    an energy providing means for providing energy to each electronic lock of the at least one bicycle rack, the energy providing means comprising a corresponding attaching means having an electrical connector operatively coupled thereto; and
    a structure to be installed at said given location, the structure comprising:
        an elongated base;
        a plurality of spaced-apart receiving means located on said elongated base, each of the plurality of spaced-apart receiving means being adapted for receiving any one of the attaching means of the at least one bicycle rack and the attaching means of the energy providing means according to the desired configuration; and
        an electric network interconnecting each of the plurality of spaced-apart receiving means to thereby providing a modular system for providing bicycles.

2. The modular system as claimed in claim 1, wherein said elongated base comprises a sheet of rigid material having a first outer planar surface, a second outer planar surface and a third central planar surface extending therebetween, each of said receiving means extending on the central planar surface in an aligned configuration.

3. The modular system as claimed in claim 1, wherein said elongated base comprises at least one end suitable for connecting a neighboring elongated base thereto.

4. The modular system as claimed in claim 1, wherein said elongated base comprises a first end and a second end, each being suitable for connecting a corresponding neighboring elongated base thereto, said first end comprising a first connecting device and said second end comprising a second connecting device, said first connecting device being adapted for connecting with the corresponding second connecting device of said neighboring elongated base.

5. The modular system as claimed in claim 4, wherein a corresponding one of said first and second connecting devices of said elongated base comprises a securing device cooperating with the corresponding connecting device of the corresponding end of said neighboring elongated base for securing said elongated base and said neighboring elongated base together.

6. The modular system as claimed in claim 5, wherein said first connecting device comprises at least one male connector projecting horizontally and comprising a hole extending upwardly, and wherein said second connecting device comprises at least one corresponding female connector projecting horizontally and comprising a corresponding hole extending upwardly, each hole of two corresponding connecting devices extending in an aligned configuration when connected together for providing a screw passage, said securing device comprising a corresponding bore extending through the elongated base and a screw adapted for insertion in said screw passage through the bore of the elongated base.

7. The modular system as claimed in claim 6, wherein said first connecting device comprises an additional male connector and said second connecting device comprises an additional female connector, said securing device further comprising an additional corresponding bore extending through the elongated base and an additional screw.

8. The modular system as claimed in claim 4, wherein each of said first connecting device and said second connecting device comprises a corresponding complementary cooperating connecting member.

9. The modular system as claimed in claim 1, wherein said structure comprises a wire housing mounted under said elongated base and extending therealong for receiving at least a portion of said electric network.

10. The modular system as claimed in claim 1, wherein each of said receiving means of said structure comprises an attaching device adapted for cooperating with a corresponding one of the attaching means of the at least one bicycle rack and the energy providing means.

11. The modular system as claimed in claim 10, wherein said attaching device of each of said receiving means comprises a plurality of holes, each of said attaching means of said at least one bicycle rack and said energy providing means comprising a plurality of corresponding holes and a plurality of corresponding screws for screwing said attaching means to a corresponding attaching device of said receiving means.

12. The modular system as claimed in claim 11, wherein the plurality of holes of each of said attaching means of said at least one bicycle rack and said energy providing means and the plurality of holes of said attaching device of each of said receiving means are arranged in a symmetrical configuration adapted for enabling an attaching of said at least one bicycle rack and said energy providing means in a first direction and in an second opposed direction.

13. The modular system as claimed in claim 1, wherein said energy providing means comprise a solar energy providing means.

14. The modular system as claimed in claim 13, wherein said energy providing means comprise a base provided with said attaching means, an elongated member mounted on said base and a solar panel assembly mounted on said elongated member.

15. The modular system as claimed in claim 14, wherein said energy providing means further comprise a plurality of batteries mounted with said base and operatively connected to said solar panel assembly.

16. The modular system as claimed in claim 1, further comprising a bicycle providing means interconnected to the electric network for managing a providing of a corresponding bicycle to a user.

17. The modular system as claimed in claim 16, wherein said bicycle providing means comprises a user interface for establishing communication between said system and a user, said bicycle providing means further comprising a control unit for controlling the electronic lock of said at least one bicycle rack according to a user request.

18. The modular system as claimed in claim 16, wherein said bicycle providing means is integrated with said energy providing means.

19. The modular system as claimed in claim 1, further comprising a servicing module having a corresponding attaching means for attaching said servicing module in a corresponding one of said receiving means, said servicing module being selected from a group comprising an advertising module, a vending machine, a ticket distribution booth and a payment module for renting at least a corresponding one of said bicycles.

20. The modular system as claimed in claim 19, wherein said servicing module comprises a payment module comprising means for communicating with a distant server.

21. The modular system as claimed in claim 1, wherein said electric network comprises a plurality of network connectors, each being provided proximate to a corresponding receiving means of said elongated base for connecting with a corresponding connector of the at least one bicycle rack and the energy providing means, said electric network further comprising at least one additional end connector mounted at an end thereof for coupling a neighboring electric network.

22. The modular system as claimed in claim 1, wherein the electric network interconnecting each of the plurality of spaced-apart receiving means comprises a configuration selected from a group consisting of a parallel configuration and a serial configuration.

23. The modular system as claimed in claim 1, wherein said structure further comprises a set of leveling screws mounted under the elongated base for enabling a leveling of the structure.

24. The modular system as claimed in claim 4, wherein said structure further comprises at least one ending element securable to a respective end of said elongated base, said ending element being selected from a group consisting of an end covering for covering the corresponding connecting device and an upright panel.

25. A method for installing a modular system for providing bicycles at a given location according to a desired configuration, said method comprising:
provided an elongated base comprising a plurality of spaced-apart receiving means;
laying down said elongated base at said given location;
providing at least one bicycle rack for storing a bicycle, each of said at least one bicycle rack comprising an electronic lock secured thereto for removably securing a corresponding bicycle, and a corresponding attaching means having an electrical connector operatively coupled to the electronic lock;
providing an energy providing means for providing energy;
attaching each of said at least one bicycle rack and said energy providing means in any one of said spaced-apart receiving means of said elongated base; and
electrically interconnecting each of said at least one bicycle rack and said energy providing means together.

26. The method as claimed in claim 25, further comprising:
providing at least one additional elongated base comprising a plurality of spaced-apart receiving means;
laying down said at least one additional elongated base at said given location proximate said elongated base; and
operatively connecting said at least one additional elongated base at an end of said elongated base.

27. The method as claimed in claim 25, wherein said given location is selected from a group consisting of a sidewalk, a portion of a street, a parking lot, a park, a beach and a substantially horizontal surface.

28. The method as claimed in claim 25, wherein said desired configuration comprises an initial predetermined configuration defined according to an intended use, said method further comprising:
monitoring use of said bicycles for providing current usage information based on said initial predetermined configuration;
defining an optimal configuration for said modular system based on said current usage information, said optimal configuration comprising an optimal number of said bicycles and said associated bicycle racks and a corresponding number of elongated bases; and
configuring the modular system according to said optimal configuration, said configuring comprising:
providing said corresponding number of elongated bases;
laying down said corresponding number of elongated bases at said given location;
operatively connecting each of said corresponding number of elongated bases together;
providing said optimal number of said bicycles and said associated bicycle racks;
attaching each of said optimal number of bicycle racks in a corresponding one of said spaced-apart receiving means of a corresponding one of said elongated bases; and
electrically interconnecting each of said optimal number of bicycle racks and said energy providing means together.

29. The method as claimed in claim 28, wherein said current usage information comprises a bicycle occupation rate associated with each of said bicycles.

30. A method for providing bicycles at a given location according to a desired configuration, said method comprising:
providing a modular system as defined in claim 1;
installing said modular system at said given location according to said desired configuration;
establishing communication between the system and a user for defining a user request;
providing a corresponding bicycle to said user according to said user request; and
after use, collecting the corresponding bicycle from the user.

31. The method for providing bicycles as claimed in claim 30, wherein the collecting is performed at another location provided with another modular system.

32. The method for providing bicycles as claimed in claim 30, wherein said providing a corresponding bicycle is done for a fee.

33. A method of doing business in providing bicycles at a given location according to a desired configuration with the modular system as claimed in claim 1, wherein said providing a corresponding bicycle is done for a fee.

34. The method of doing business as claimed in claim 33, wherein said providing a corresponding bicycle is done by a third party.

35. A method of doing business in providing bicycles at a given location according to a desired configuration, said method comprising:
- providing by a provider a modular system as claimed in claim 1 to a third party;
- operating the modular system wherein said operating is done by a third party for a fee; and
- reconveying by the third party a portion of said fee to said provider.

36. The method of doing business as claimed in claim 35, wherein said fee is determined according to an occupation rate associated to each of the corresponding bicycles.

* * * * *